(12) United States Patent
Herbst et al.

(10) Patent No.: US 7,472,237 B1
(45) Date of Patent: Dec. 30, 2008

(54) APPARATUS TO OFFLOAD AND ACCELERATE PICO CODE PROCESSING RUNNING IN A STORAGE PROCESSOR

(75) Inventors: Ryan Taylor Herbst, Redwood City, CA (US); James L. Cihla, San Jose, CA (US); Rahim Ibrahim, Mountain View, CA (US); James L. Vuong, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 438 days.

(21) Appl. No.: 10/696,624

(22) Filed: Oct. 28, 2003

Related U.S. Application Data

(60) Provisional application No. 60/422,109, filed on Oct. 28, 2002.

(51) Int. Cl.
  *G06F 12/00* (2006.01)
(52) U.S. Cl. .................................. 711/152
(58) Field of Classification Search .......... 711/152, 711/163–164; 710/200; 707/8
  See application file for complete search history.

(56) References Cited

U.S. PATENT DOCUMENTS

| | | | |
|---|---|---|---|
| 5,682,537 A * | 10/1997 | Davies et al. ............... | 710/200 |
| 6,343,339 B1 * | 1/2002 | Daynes ....................... | 710/200 |
| 6,535,968 B2 * | 3/2003 | Pham .......................... | 711/167 |
| 6,757,769 B1 * | 6/2004 | Ofer ............................ | 710/200 |
| 6,965,893 B1 * | 11/2005 | Chan et al. ..................... | 707/8 |
| 7,085,911 B2 * | 8/2006 | Sachedina et al. ........... | 711/206 |
| 2003/0084268 A1 * | 5/2003 | Mashima .................... | 711/202 |
| 2004/0006572 A1 | 1/2004 | Hoshino et al. | |
| 2004/0068607 A1 * | 4/2004 | Narad ......................... | 711/108 |
| 2004/0199734 A1 * | 10/2004 | Rajamani et al. ............ | 711/163 |

OTHER PUBLICATIONS

Tanenbaum, "Structured Computer Organization", © 1984 Prentice-Hall, Inc. p. 10-12.*

* cited by examiner

*Primary Examiner*—Brian R Peugh
(74) *Attorney, Agent, or Firm*—Leland Wiesner; Wiesner & Associates

(57) ABSTRACT

Apparatus and method offloads processing from a networking processor operating in a storage environment. Three main functions are offloaded: semaphore processing, frame order processing, and timer processing. Offloading of semaphore processing enables ordered access to semaphores. Offloading of frame order processing enables the network processor to quickly transmit an incoming frame if the incoming frame is the next one in the frame order. Offloading of timer processing enables background checking of the timer list.

17 Claims, 22 Drawing Sheets

| Bit | 31 30 29 28 27 26 25 24 23 22 21 20 19 18 17 16 15 14 13 12 11 10 9 8 7 6 5 4 3 2 1 0 |
|---|---|
| Data | Semaphore Value |
| Bit | 63 62 61 60 59 58 57 56 55 54 53 52 51 50 49 48 47 46 45 44 43 42 41 40 39 38 37 36 35 34 33 32 |
| Data | Wait Entry 1 | Wait Entry 0 | Curr. Thread | Wait Count | V | Next Semaphore Pointer |
| Bit | 95 94 93 92 91 90 89 88 87 86 85 84 83 82 81 80 79 78 77 76 75 74 73 72 71 70 69 68 67 66 65 64 |
| Data | WE 8 | Wait Entry 7 | Wait Entry 6 | Wait Entry 5 | Wait Entry 4 | Wait Entry 3 | Wait Entry 2 | Cont. to 63 |
| Bit | 127 126 125 124 123 122 121 120 119 118 117 116 115 114 113 112 111 110 109 108 107 106 105 104 103 102 101 100 99 98 97 96 |
| Data | Wait Entry 14 | Wait Entry 13 | Wait Entry 12 | Wait Entry 11 | Wait Entry 10 | Wait Entry 9 | WE 8 |

~ 124

220

| Bit | 31 30 29 28 27 26 25 24 23 22 21 20 19 18 17 16 15 14 13 12 11 10 9 8 7 6 5 4 3 2 1 0 |
|---|---|
| Lword 0 | Spare Bits | T | V | Name Frame Structure Pointer [20:0] |
| Lword 1 | Next Frame [15:0] | Expected Frame [15:0] |

V = Pointer Valid Flag      T = TX In Progress Bit

| Bit | 31 30 29 28 27 26 25 24 23 22 21 20 19 18 17 16 15 14 13 12 11 10 9 8 7 6 5 4 3 2 1 0 |
|---|---|
| Lword 0 | Spare Bits | A | V | Next Frame Structure Pointer [20:0] |
| Lword 1 | Stored Frame #[15:0] | Next Frame # [15:0] |
| Lword 2 | Spare Bits | Buffer Address[19:0] |
| Lword 3 | Spare Bits | BCI Data[19:0] |

V = Pointer Valid Flag      A = Frame Active Bit

| Bit | 31 30 29 28 27 26 25 24 23 22 21 20 19 18 17 16 15 14 13 12 11 10 9 8 7 6 5 4 3 2 1 0 |
|---|---|
| Init Queue Command | Expected Frame[15:0] | Queue[15:0] |

| Response | Value |
|---|---|
| Init Success | 0x0 |
| Init Fail | 0x1 |

| Bit | 31 30 29 28 27 26 25 24 23 22 21 20 19 18 17 16 | 15 14 13 12 11 10 9 8 7 6 5 4 3 2 1 0 |
|---|---|---|
| Frame Pop Command | Unused | Queue[15:0] |

| Response | Value |
|---|---|
| Queue Empty | 0x0 |
| Frame Popped | 0x1 |

*228*

| Bit | 31 30 29 28 27 26 25 24 23 22 21 20 19 18 17 16 15 14 13 12 11 10 9 8 7 6 5 4 3 2 1 0 |
|---|---|
| Read Buffer Long Word 0 | Null Data |
| Read Buffer Long Word 1 | Null Data | Buffer Address[19:0] |
| Read Buffer Long Word 2 | Null Data | BCI Value[19:0] |

| Bit | 31 30 29 28 27 26 25 24 23 22 21 20 19 18 17 16 | 15 14 13 12 11 10 9 8 7 6 5 4 3 2 1 0 |
|---|---|---|
| Frame Rx Command (LW 0) | Received Frame[15:0] | Queue[15:0] |
| Frame Rx Command (LW 1) | Unused | Buffer Address[19:0] |
| Frame Rx Command (LW 2) | Unused | BCI Value[19:0] |

| Response | Value |
|---|---|
| Frame TX | 0x0 |
| Frame Store | 0x1 |
| Frame Error | 0x2 |

| Bit | 31 30 29 28 27 26 25 24 23 22 21 20 19 18 17 16 | 15 14 13 12 11 10 9 8 7 6 5 4 3 2 1 0 |
|---|---|---|
| Frame Poll Command | Unused | Queue[15:0] |

| Response | Value |
|---|---|
| No Frame | 0x0 |
| Frame TX | 0x1 |

*234*

| Bit | 31 30 29 28 27 26 25 24 23 22 21 20 19 18 17 16 15 14 13 12 11 10 9 8 7 6 5 4 3 2 1 0 |
|---|---|
| Read Buffer Long Word 0 | Null Data |
| Read Buffer Long Word 1 | Null Data | Buffer Address[19:0] |
| Read Buffer Long Word 2 | Null Data | BCI Value[19:0] |

FIG. 15

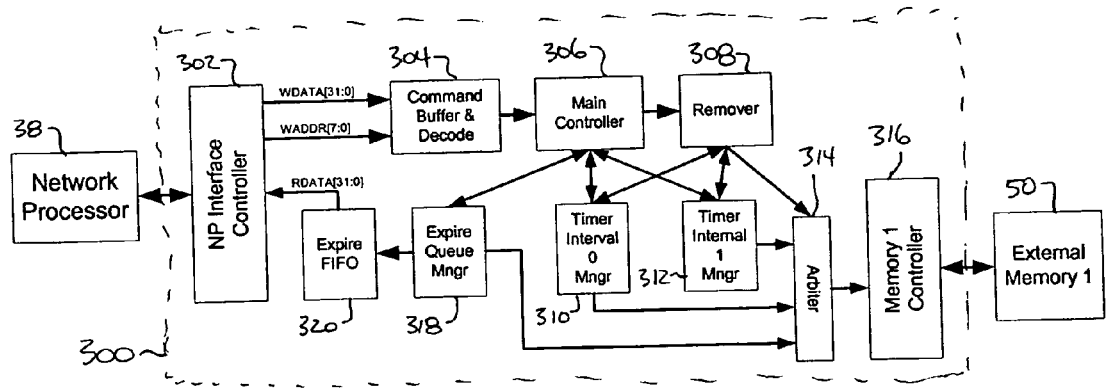
FIG. 23
| Bit | 31 30 29 28 27 26 25 24 23 22 21 20 19 18 17 16 15 14 13 12 11 10 9 8 7 6 5 4 3 2 1 0 |
|---|---|
| Data | Up Pointer[14:1] | Loop Count[17:0] |
| Bit | 63 62 61 60 59 58 57 56 55 54 53 52 51 50 49 48 47 46 45 44 43 42 41 40 39 38 37 36 35 34 33 32 |
|---|---|
| Data | S S A E DV Down Pointer[20:1] UV Up Pointer[20:15] |
| Bit | 95 94 93 92 91 90 89 88 87 86 85 84 83 82 81 80 79 78 77 76 75 74 73 72 71 70 69 68 67 66 65 64 |
|---|---|
| Data | Interval Time[31:2] C[17:16] |
| Bit | 127 126 125 124 123 122 121 120 119 118 117 116 115 114 113 112 111 110 109 108 107 106 105 104 103 102 101 100 99 98 97 96 |
|---|---|
| Data | Original Loop Count[15:0] Timeout Handler[15:0] |
330
XV = Up / Down Pointer Valid Flags
S = Spare Bit
E = Expired Flag
A = Active Flag
C[17:16] = Original Loop Count Cont.
| E | A | Timer State |
|---|---|---|
| 0 | 0 | Idle |
| 0 | 1 | Active |
| 1 | 0 | Expired |
| 1 | 1 | RSVD |
FIG. 24
332
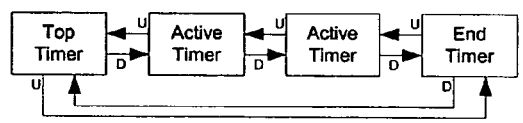
FIG. 25

334

| Bit | 31 30 29 28 27 26 25 24 23 22 21 20 19 18 17 | 16 | 15 14 13 12 11 10 9 8 7 6 5 4 3 2 1 0 |
|---|---|---|---|
| Start Timer (LW 1) | Spare Bits | INT | Timer ID[15:0] |
| Start Timer (LW 2) | Spare Bits | | Loop Count[17:0] |
| Start Timer (LW 3) | Spare Bits | | Timeout Handler[15:0] |

| Response | Value |
|---|---|
| Start Ack | 0x0 |
| Start Error | 0x1 |

| INT | Timer Interval |
|---|---|
| 0 | 100ms |
| 1 | 1S |

| Bit | 31 30 29 28 27 26 25 24 23 22 21 20 19 18 17 16 | 15 14 13 12 11 10 9 8 7 6 5 4 3 2 1 0 |
|---|---|---|
| Stop Timer | Spare Bits | Timer ID[15:0] |

| Response | Value |
|---|---|
| Stop Ack | 0x0 |
| Stop Error | 0x1 |
| Stop Expired | 0x2 |

| Bit | 31 30 29 28 27 26 25 24 23 22 21 20 19 18 17 16 | 15 14 13 12 11 10 9 8 7 6 5 4 3 2 1 0 |
|---|---|---|
| Restart Timer | Spare Bits | Timer ID[15:0] |

| Response | Value |
|---|---|
| Restart Ack | 0x0 |
| Restart Error | 0x1 |
| Restart Expired | 0x2 |

| Bit | 31 30 29 28 27 26 25 24 23 22 21 20 19 18 17 16 15 14 13 12 11 10 9 8 7 6 5 4 3 2 1 0 |
|---|---|
| Read Expired (LW 0) | NULL Data |
| Read Expired (LW 1) | NULL Data | V | Timeout Handler[15:0] |

V = Timeout Handler Valid

| Bit | 31 30 29 28 27 26 25 24 23 22 21 20 19 18 17 16 15 14 13 12 11 10 9 8 7 6 5 4 3 2 1 0 |
|---|---|
| Clear Expired | Spare Bits | Timer ID[15:0] |

| Response | Value |
|---|---|
| Clear Ack | 0x0 |
| Clear Error | 0x1 |

FIG. 30

APPARATUS TO OFFLOAD AND ACCELERATE PICO CODE PROCESSING RUNNING IN A STORAGE PROCESSOR

CROSS-REFERENCES TO RELATED APPLICATIONS

The present application claims priority to U.S. Provisional Application No. 60/422,109 titled "Apparatus and Method for Enhancing Storage Processing in a Network-Based Storage Virtualization System" and filed Oct. 28, 2002, which is incorporated herein by reference.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates to storage area networks (SANs). In particular, the present invention relates to an offload processor in a storage server.

FIG. 1 is a block diagram of a storage area network (SAN) system 10. The SAN system 10 includes a host 12, a network 14, a storage server 16, and a storage system 18. The host 12 generally includes a computer that may be further connected to other computers via the network 14 or via other connections. The network 14 may be any type of computer network, such as a TCP/IP network, an Ethernet network, a token ring network, an asynchronous transfer mode (ATM) network, a Fibre Channel network, etc. The storage system 18 may be any type of storage system, such as a disk, disk array, RAID (redundant array of inexpensive disks) system, etc.

The storage server 16 generally transparently connects the host 12 to the storage system 18. More specifically, the host 12 need only be aware of the storage server 16, and the storage server 16 takes responsibility for interfacing the host 12 with the storage system 18. Thus, the host 12 need not be aware of the specific configuration of the storage system 18. Such an arrangement allows many of the storage management and configuration functions to be offloaded from the host.

Such offloading allows economies of scale in storage management. For example, when the storage system 10 has multiple hosts on the network 14 and the components of the storage system 18 are changed, all the hosts need not be informed of the change. The change may be provided only to the storage server 16.

Similar concepts may be applied to other storage system architectures and arrangements such as networked attached storage (NAS), etc.

It is advantageous for the storage server 16 to quickly perform its SAN network processing functions. Such functions include semaphore management, out-of-order frame processing, and timer management.

Semaphore management involves managing semaphores that control access to data space. For example, if one process thread is accessing a particular data space of the storage system 18, then no other process threads should access that data space until the first process thread has completed its access. Otherwise the second process thread could alter the data in the data space in a detrimental manner. Semaphore management is typically performed in software.

Out-of-order frame processing involves re-arranging frames received out of order by the storage server 16. For example, if the storage server 16 is accessing data that is stored on more than one disk 18, the data from one disk 18 may arrive before the data from another disk 18. The host 12 expects the data in a particular order, so the storage server 16 typically re-orders the data before it is forwarded on to the host 12. Frame re-ordering is typically performed in software.

Timer management involves creating, checking, and stopping timers related to various activities that the storage server 16 performs. For example, the storage server 16 sets a timer when accessing an element of the storage system 18. If the element fails to respond, the timer expires, triggering action by the storage server 16 to re-access the element, to perform diagnostic processing, or to otherwise respond to the failure. Timer management is typically performed in software.

Typical implementations of the above three functions may be inefficient. The software implementing each function typically occupies the general code space in the storage server 16. Such code space is a limited resource that it is often advantageous to conserve. The execution of such software requires processor overhead.

Aspects of the present invention are directed toward improving the operation of these three functions in the storage server 16.

BRIEF SUMMARY OF THE INVENTION

Aspects of the present invention are directed toward a co-processor that offloads selected functions of a network processor operating in a storage environment.

According to one aspect of the present invention, the co-processor includes semaphore circuitry that receives a signal from the network processor and controls a semaphore related to the signal for locking and unlocking access to data. The semaphore circuitry manages a queue of access requests for a particular semaphore, enabling ordered access to the semaphore.

According to another aspect of the present invention, the co-processor includes ordering circuitry that tracks an order of incoming frames received by the network processor and controls an order of outgoing frames transmitted by the network processor. When the network processor receives an incoming frame, it checks with the co-processor to see if the incoming frame is in order. If so, it transmits the frame immediately without having to perform involved memory accesses. If not, it stores the frame for future transmission.

According to still another aspect of the present invention, the co-processor includes timer circuitry that manages timers as requested by the network processor and that generates a timing result when one of the timers is completed. The timers are arranged in a doubly-linked list, which reduces overhead and enables efficient insertion of a new timer into the doubly-linked list. Various granularities of timers are provided.

In this manner, the co-processor improves the performance of the network processor by offloading these selected functions.

A more complete understanding of the present invention may be gained from the following figures and related detailed description.

BRIEF DESCRIPTION OF THE DRAWINGS

FIG. 10 is a diagram of a queue head structure used by the ordering processor of FIG. 9.

FIG. 11 is a diagram of a frame structure used by the ordering processor of FIG. 9.

FIG. 12 is a diagram of a queue initialization command used by the ordering processor of FIG. 9.

FIG. 13 is a diagram of a frame pop command used by the ordering processor of FIG. 9.

FIG. 14 is a diagram of a frame received command used by the ordering processor of FIG. 9.

FIG. 15 is a diagram of a frame poll command used by the ordering processor of FIG. 9.

FIG. 23 is a block diagram of a timer manager according to an embodiment of the present invention.

FIG. 24 is a diagram of a restart timer command used by the timer manager of FIG. 23.

FIG. 25 is a diagram of a doubly-linked list used by the timer manager of FIG. 23.

FIG. 26 is a diagram of a start timer command used by the timer manager of FIG. 23.

FIG. 27 is a diagram of a stop timer command used by the timer manager of FIG. 23.

FIG. 28 is a diagram of a restart timer command used by the timer manager of FIG. 23.

FIG. 29 is a diagram of a read expired command used by the timer manager of FIG. 23.

FIG. 30 is a diagram of a clear expired command used by the timer manager of FIG. 23.

DETAILED DESCRIPTION OF THE INVENTION

Figure 1:
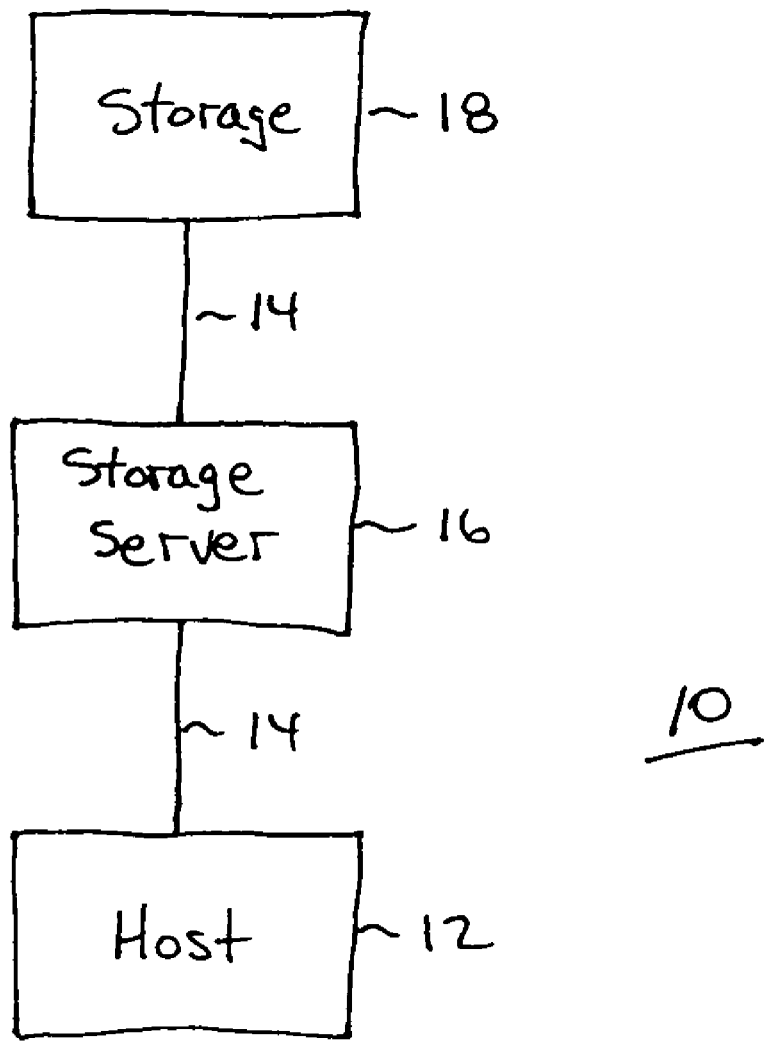
FIG. 1 is a block diagram of a storage area network system.
Figure 2:
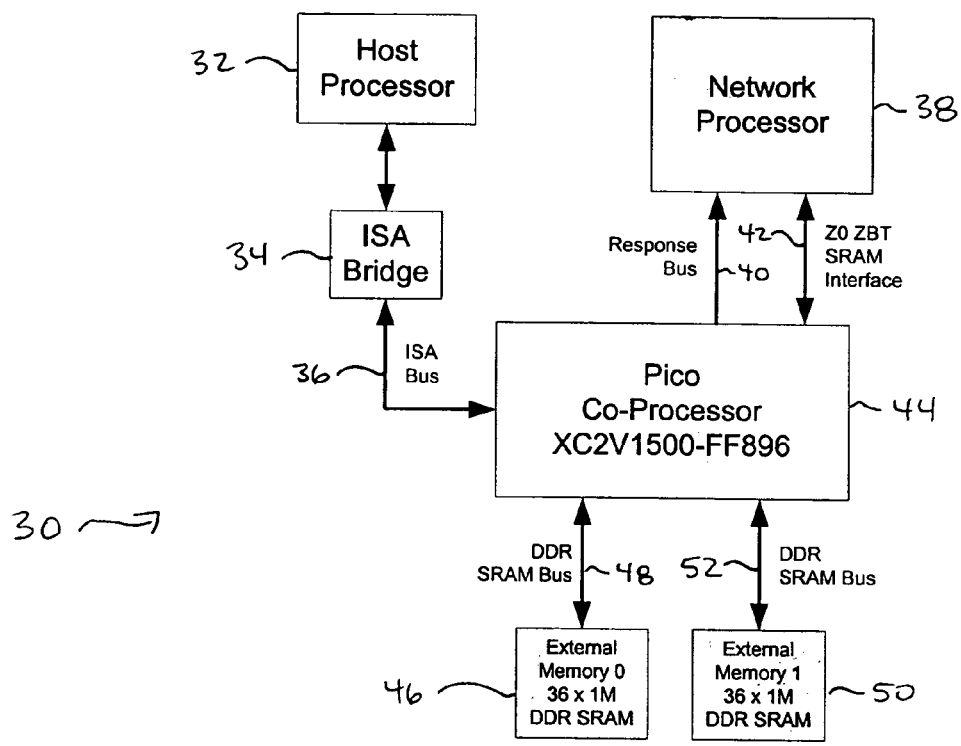
FIG. 2 is a block diagram of a storage server according to an embodiment of the present invention.

FIG. 2 is a block diagram of a storage server 30 according to an embodiment of the present invention. The storage server 30 includes a host processor 32, an ISA bridge 34, an ISA (industry standard architecture) bus 36, a network processor 38, a response bus 40, a Z0 ZBT (zero bus turnaround) SRAM (static random access memory) interface 42, a co-processor 44, a first external memory 46, a first DDR (double data rate) SRAM bus 48, a second external memory 50, and a DDR SRAM bus 52. The storage server 30 also includes other components (not shown), the details of which are not necessary for an understanding of the present invention.

The host processor 32 controls the configuration and general operation of the storage server 30. The ISA bridge 34 connects the host processor 32 to the co-processor 44 over the ISA bus 36.

The network processor 38 controls the routing of data frames into and out of the storage server 30. The network processor executes software that may also be referred to as "pico code". The pico code controls the operation of the network processor 38. The network processor 38 is coupled to the co-processor 44 over the Z0 ZBT SRAM interface 42. The co-processor may also communicate with the network processor 38 via the response bus 40.

The co-processor 44 offloads some of the functions performed by the pico code on the network processor 38. The co-processor 44 may also be referred to as "the pico co-processor" (or more generally as "the processor" in context). The co-processor 44 may be implemented as a field programmable gate array (FPGA) device or programmable logic device (PLD) that has been configured to perform the desired functions.

The first external memory 46 and the second external memory 50 may each be implemented as 36×1M DDR SRAMs. Other size SRAMs and other memory technologies may also be used. The first external memory 46 and the second external memory 50 are coupled to the co-processor 44 via the first DDR SRAM bus 48 and the second DDR SRAM bus 52, respectively.

The Pico Co-Processor 44 is designed to offload some of the functions performed by the Pico code running inside the network processor. The Pico Co-Processor 44 is connected to the Network Processor 38 replacing the Z0 ZBT SRAM that may be customarily attached. Data and commands may be transferred to and from the Pico Co-Processor 44 using ZBT SRAM cycles. Some commands may issue a response to the Network Processor 38 using the support CAM (content addressable memory) response bus 40.

The Pico Co-Processor 44 may be configured and monitored by the host processor 32 over the ISA bus 36. It is also possible for the processors (not shown) in the network processor 38 to monitor the Pico Co-Processor 44 through the ISA bus 36.

The Pico Co-Processor 44 uses two DDR SRAM banks 46 and 50 for storing tables and other structures used by the various internal modules. According to one embodiment, the interfaces 48 and 52 between the Pico Co-Processor 44 and the two SRAM banks 46 and 50 operate at 133 Mhz and are parity protected.

The following modules inside the Pico Co-Processor 44 provide offload functions for the Pico code of the network processor 38:

Semaphore Manager: Manages locks on 32-bit values that are requested and released by Pico code as internal shared structures are locked and unlocked.

Out of Order Processor: Assists Pico code by tracking out of order frames and returning pointers to frame data in the proper order.

Timer Manager: Allows Pico code to create and delete general-purpose timers.

Semaphore Manager

Figure 3:
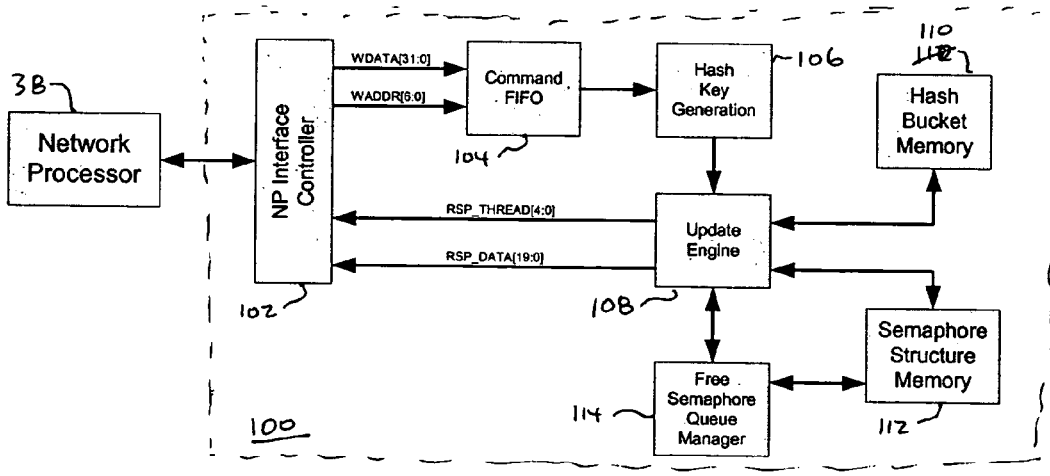
FIG. 3 is a block diagram of a semaphore manager according to an embodiment of the present invention.

FIG. 3 is a block diagram of a semaphore manager 100 according to an embodiment of the present invention. The semaphore manager 100 is part of the processor 44 (see FIG. 2). The semaphore manager 100 includes an interface controller 102, a command FIFO 104, a hash key generator 106, an update engine 108, a hash bucket memory 110, a semaphore structure memory 112, and a free semaphore queue manager 114.

The interface controller 102 interfaces the semaphore manager circuitry to the network processor 38. The command FIFO 104 processes input data as it is received from the network processor 38. The input data from the network processor 38 is generally in the form of commands to the semaphore manager 100. The input data is generally 32 bits of command data and 7 bits of address data.

The hash key generator 106 generates a hash key from a semaphore value. According to the embodiment of FIG. 3, the semaphore value is 32 bits and the hash key is 10 bits.

The update engine 108 performs the main functions of semaphore processing, which are discussed in more detail below. The update engine communicates information back to the network processor 38 via the interface controller 102.

The hash bucket memory 110 stores numerous linked lists of active semaphore structures. The semaphore structure memory stores information regarding semaphores and the process threads on the network processor 38 that are waiting to lock the semaphores.

In general, the Semaphore Manager 100 allows the NP Pico code to lock and unlock 32-bit values over the Z0 interface 42. The results of the lock and unlock requests are passed back to the thread over the Z0 response bus 42.

The data structures used in the Semaphore Manager reside in internal FPGA block RAM, namely, the hash bucket memory 110 and the semaphore structure memory 112.

Figures 4, 5:
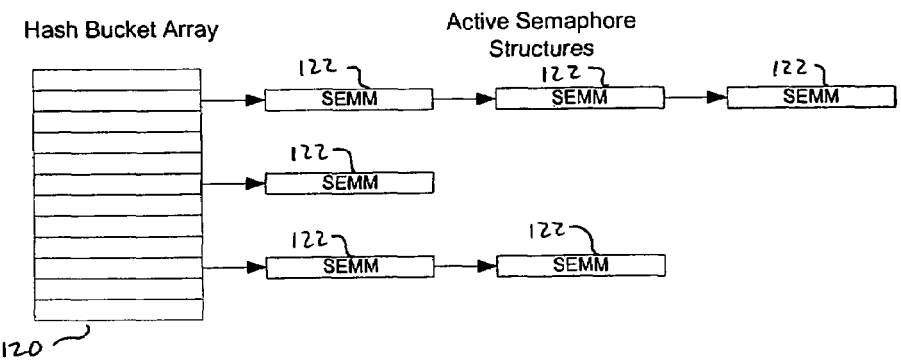
FIG. 4 is a diagram of a hash structure used by the semaphore manager of FIG. 3.
FIG. 5 is a diagram of a semaphore structure used by the semaphore manager of FIG. 3.

FIG. 4 is a representation of the hash bucket memory 110. The hash bucket memory 110 includes an array 120 of 11-bit bucket pointers that each serve as the head pointer of a linked list of active semaphore structures 122. The hash key generator 106 performs a hash function to convert the 32-bit semaphore value to a 10-bit hash address pointing to one of 1024 locations in the Hash Bucket Array 120.

FIG. 5 is a representation of a semaphore structure 124 stored in the semaphore structure memory 112. The semaphore structure 124 is a 128-bit entry in the semaphore memory 112. Generally, each of the semaphore structures 124 stores a locked semaphore value, the current thread that owns the lock, and a list of threads that are waiting to lock of the semaphore.

More specifically, the semaphore structure 124 contains the semaphore value, a pointer to the next semaphore in a linked list, the id of the owner thread running on the network processor 38, a count of requesting threads, and a list of requesting thread values. The pointer valid flag indicates if the pointer field contains a valid next semaphore pointer. The next semaphore pointer contains extra bits for future expansion. According to the embodiment of FIG. 5, each semaphore structure may store the current owner as well as 15 waiting threads. According to the embodiment of FIG. 5, the semaphore memory currently supports 512 entries. These numbers may be adjusted as desired in other embodiments.

Semaphore Manager Commands

Three commands supported by the Semaphore Manager 100 are "Semaphore Request", "Semaphore Release", and "Thread Exit".

A "Semaphore Request" command involves a 32-bit write to the request address associated with the requesting thread. The 32-bit value written is the value that is to be locked by the Semaphore Manager 100. If an error occurs in the processing of the lock request, an error response may be sent to the thread over the response bus 40. A "Semaphore Overflow" response is sent if the number of threads in line for the lock request exceeds the tracking ability of the semaphore structure 124 (15 threads according to the embodiment of FIG. 5). If no error or overflow occurs, the thread will receive a response when the thread has been issued the lock.

A "Semaphore Release" command involves a 32-bit write to the release address associated with the requesting thread. The 32-bit value written is the value that is to be released by the Semaphore Manager 100. If an error occurs when attempting to find the semaphore value, an error response will be sent to the thread over the response bus 40. If the release succeeds, a "Release Acknowledge" response will be sent to the thread over the response bus 40. If another thread was waiting in line for the semaphore, then a "Request Acknowledge" response will be sent to the next thread in line.

A thread requesting a semaphore lock will usually expect a response. A thread releasing a semaphore lock is not required to wait for a release response from the semaphore manager. The following table defines the response values received from the semaphore manager.

TABLE 1

Semaphore Manager Response Values

| Value | Operation | Meaning |
| --- | --- | --- |
| 0x0 | Request | Semaphore Request Acknowledge |
| 0x1 | Release | Semaphore Release Acknowledge |
| 0x4 | Release | Semaphore Release Fail |
| 0x5 | Request | Semaphore Structure Overflow, Retry Request |
| 0x6 | Release | Semaphore Release When Not Owner |
| 0x7 | Request | Semaphore Structure Allocation Failure, Retry Request |

The third command support by the semaphore manager is "Thread Exit". This command is issued when the thread is about to exit. This command is used to detect a situation where a thread exits prematurely and still either owns a semaphore lock or is in line for a semaphore lock. If a "Thread Exit" command is issued and the thread still is active in one or more semaphores, the THREAD_ERR bit will be set and an interrupt can be asserted to either the Host Processor 32 or a processor in the network processor 38. The "Thread Exit" command need not have a response.

Semaphore Manager Operation

Figure 6:
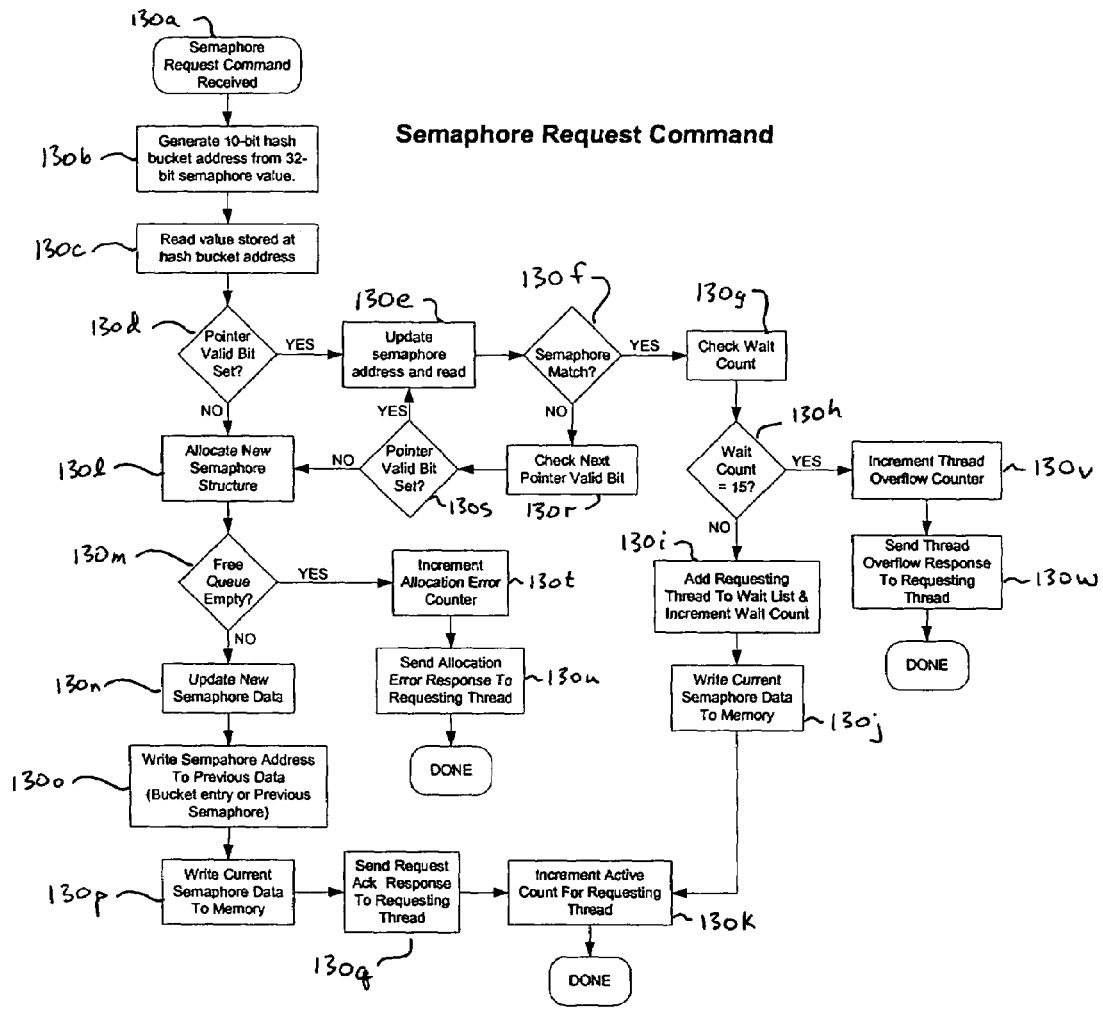
FIG. 6 is a flow diagram for the semaphore request command executed by the semaphore manager of FIG. 3.

FIG. 6 is a flow diagram of the "Semaphore Request" command. This process is started by a thread writing a 32-bit value to the Semaphore Request address space in the Z0 memory map.

In step 130a, the semaphore manager 100 receives the "Semaphore Request" command. In step 130b, the hash key generator 106 generates a 10-bit hash bucket address from the 32-bit semaphore value. In step 130c, the update engine 108 reads the value stored at the hash bucket address. In step 130*d*, the update engine 108 checks whether the pointer valid bit is set. If so, in step 130*e*, the update engine 108 updates the semaphore address (resulting from accessing the hash bucket memory 110) and performs a read from the semaphore structure memory 112. In step 130*f*, the update engine 108 determines whether the semaphore value matches that of the semaphore structure 124 read. If so, in step 130*g*, the update engine 108 checks the wait count for the semaphore structure 124. In step 130*h*, the update engine 108 compares the wait count to the maximum number of waiting threads allowed by the semaphore structure 124, which is 15 threads in the embodiment of FIG. 5. If the wait count has not reached its limit, in step 130*i*, the update engine 108 adds the requesting thread to the wait list in the semaphore structure 124 and increments the wait count. In step 130*j*, the update engine 108 writes the current semaphore data to the semaphore structure memory 112. In step 130*k*, the update engine 108 increments the active count for the requesting thread. The process is then complete for that command.

Step 130*l* occurs from step 130*d* if the pointer valid bit is not set (or from step 130*s* as described below). In step 130*l*, the update engine 108 allocates a new semaphore structure. In step 130*m*, the update engine 108 checks with the free semaphore queue manager 114 to see if the free queue is empty. If not, in step 130*n*, update engine 108 updates the new semaphore data. In step 130*o*, the update engine 108 writes the semaphore address to the previous data (either the bucket entry or the previous semaphore). In step 130*p*, the update engine 108 writes the current semaphore data to the semaphore structure memory 112. In step 130*q*, the update engine sends a request acknowledgement response to the requesting thread on the network processor 38 via the interface controller 102. The process then moves to step 130*k* as above.

Step 130*r* occurs if in step 130*f* the semaphore does not match. In step 130*r*, the update engine 108 looks at the next structure in the hash bucket memory 110 and checks the pointer valid bit. In step 130*s*, if the pointer valid bit is set, the process then moves to step 130*e* as above. If the pointer valid bit is not set in step 130*s*, the process then moves to step 130*l* as above.

Step 130*t* occurs if in step 130*m* the free queue is empty. In step 130*t*, the update engine 108 increments the allocation error counter. In step 130*u*, the update engine 108 sends an allocation error response to the requesting thread on the network processor 38. The process is then complete for that command.

Step 130*v* occurs if in step 130*h* the wait count hits its maximum value. In step 130*v*, the update engine 108 increments the thread overflow counter. In step 130*w*, the update engine 108 sends a thread overflow response to the requesting thread on the network processor 38. The process is then complete for that command.

Figure 7:
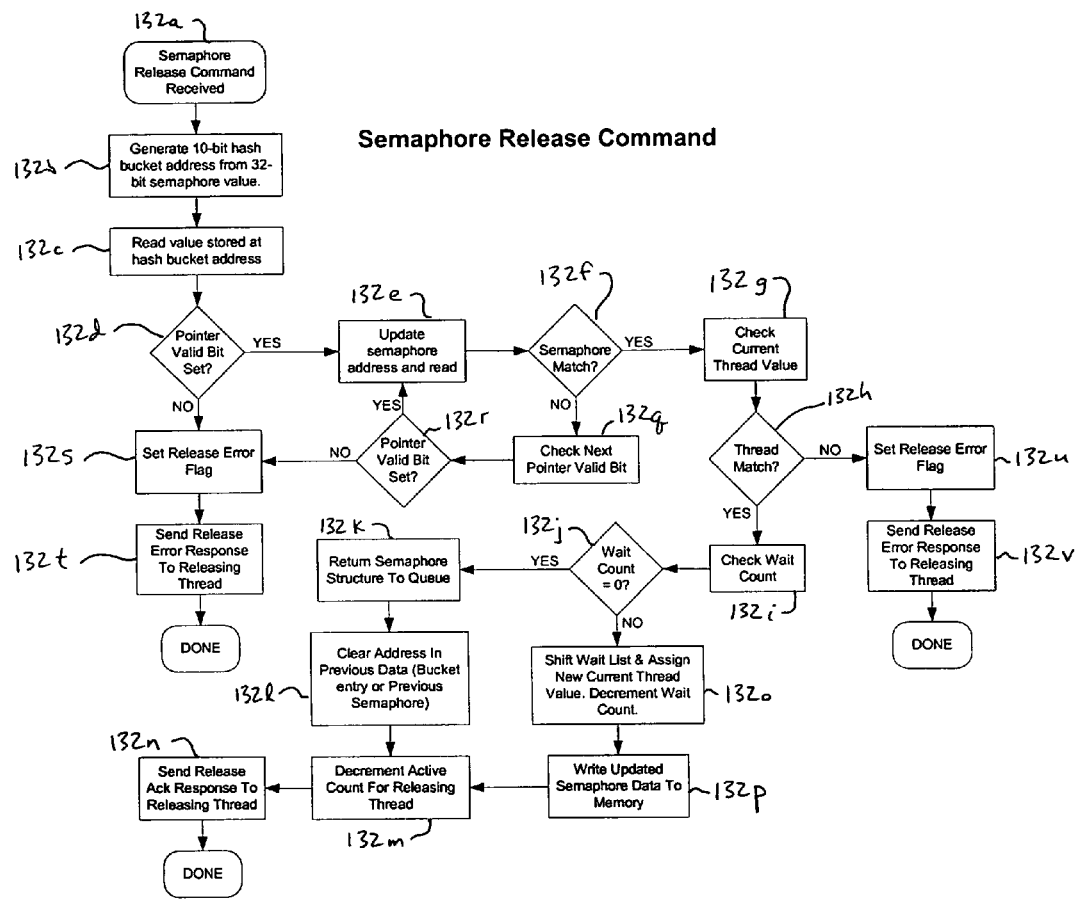
FIG. 7 is a flow diagram for the semaphore release command executed by the semaphore manager of FIG. 3.

FIG. 7 is a flow diagram of the "Semaphore Release" command. This process is started by a thread writing a 32-bit value to the Semaphore Release address space in the Z0 memory map.

In step 132*a*, the semaphore manager 100 receives the "Semaphore Release" command. In step 132*b*, the hash key generator 106 generates a 10-bit hash bucket address from the 32-bit semaphore value. In step 132*c*, the update engine 108 reads the value stored at the hash bucket address. In step 132*d*, the update engine 108 checks whether the pointer valid bit is set. If so, in step 132*e*, the update engine 108 updates the semaphore address (resulting from accessing the hash bucket memory 110) and performs a read from the semaphore structure memory 112. In step 132*f*, the update engine 108 determines whether the semaphore value matches that of the semaphore structure 124 read. If so, in step 132*g*, the update engine 108 checks the current thread value for the semaphore structure 124. In step 132*h*, the update engine 108 verifies whether the current thread value corresponds to the thread sending the semaphore release command. If so, in step 132*i*, the update engine 108 checks the wait count for the semaphore structure 124. In step 132*j*, the update engine 108 compares the wait count to zero (that is, that there are no other threads in line for that semaphore). If so, in step 132*k*, the update engine 108 works with the free semaphore queue manager 114 to return the semaphore structure to the queue. In step 132*l*, the update engine 108 clears the address in the previous data (either the bucket entry or the previous semaphore). In step 132*m*, the update engine 108 decrements the active count for the releasing thread. In step 132*n*, the update engine sends a release acknowledgement response to the releasing thread. The process is then complete for that command.

Step 132*o* occurs if in step 132*j* the wait count is not zero (that is, that other threads are in line for that semaphore). In step 132*o*, the update engine 108 shifts the wait list and assigns the new current thread value. The update engine 108 also decrements the wait count. In step 132*p*, the update engine 108 writes the updated semaphore data to the semaphore structure memory 112. The process then moves to step 132*m* as above.

Step 132*q* occurs if in step 132*f* the semaphore does not match. In step 132*q*, the update engine 108 looks at the next structure in the hash bucket memory 110 and checks the pointer valid bit. In step 132*r*, if the pointer valid bit is set, the process then moves to step 132*e* as above.

Step 132*s* occurs if the pointer valid bit is not set from step 132*r* or step 132*d*. In step 132*s*, the update engine 108 sets the release error flag. In step 132*t*, the update engine 108 sends a release error response to the requesting thread. The process is then complete for that command.

Step 132*u* occurs from step 132*h* if the current thread value does not correspond to the thread sending the semaphore release command. In step 132*u*, the update engine 108 sets the release error flag. In step 132*v*, the update engine 108 sends a release error response to the requesting thread. The process is then complete for that command.

Figure 8:
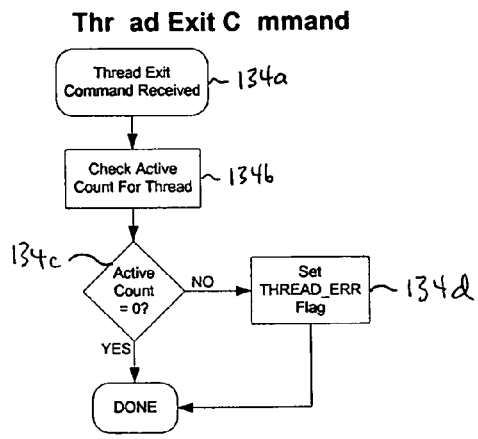
FIG. 8 is a flow diagram for the thread exit command executed by the semaphore manager of FIG. 3.

FIG. 8 is a flow diagram of the "Thread Exit" command. This is a simple command that requires no memory access.

In step 134*a*, the semaphore manager 100 receives the "Thread Exit" command. In step 134*b*, the update engine 108 checks the active count for that thread. In step 134*c*, the update engine 108 compares the active count to zero (that is, that the thread is not in line for any semaphores). If so, the process is complete for that command. If not, in step 134*d* the update engine 108 sets the thread error flag, and the process is complete for that command. The storage server 30 may then initiate diagnostic procedures to clear the thread error flag.

Semaphore Manager Initialization

The Semaphore Manager 100 may be initialized before the NP Pico code can begin requesting locks. If a thread requests a lock while the Semaphore Manager 100 is in initialization mode, the request may be lost and the SEM_LOST flag may be set.

Software begins the initialization process by setting the SEMM_RST bit in the Semaphore Manager Control register. Setting this bit holds the engines in reset. The SEMM_RST bit may then be cleared by software, starting the automatic initialization. The SEM_INIT bit in the status register allows software to detect when the initialization process has completed. Once the initialization process has completed, the NP Pico code may begin requesting and releasing semaphore locks.

Semaphore Manager Status

The Semaphore Manager 100 has a number of counters and status bits that indicate the state of the internal semaphore logic. The following counters are kept in the Semaphore Manager 100 and may be read and cleared through the ISA bus interface:

Thread Overflow Counter—This counter keeps track of the number of times the semaphore structure overflows. According to one embodiment, an overflow occurs when more than 16 threads have requested the same semaphore.

Allocation Error Counter—This counter keeps track of the number of times a new semaphore lock is requested when the free queue of semaphore structures is empty.

In addition to the previously-described counters, a number of status flags are also available to software and can be read over the ISA bus interface:

SEM_INIT—This flag is set when the Semaphore Manager is in initialization mode and should not be accessed over the Z0 interface.

SEM_LOST—This flag is set when a semaphore value has been written over the Z0 interface and did not make it to the hash/search engine. This condition may occur if a semaphore release/request is attempted when the semaphore manager is in initialization mode. This condition may also occur if the input buffer to the hash stage overflows. The assertion of this bit can generate an interrupt to the host processor and/or the network processor.

REL_FAIL—This flag is set when a thread has attempted to release a semaphore lock and the thread is not the current owner of the lock or the semaphore structure could not be found. The assertion of this bit can generate an interrupt to the host processor and/or the network processor.

THREAD_ERR—This flag is set when a thread exit command is issued and the thread is still the owner or in line for a semaphore lock. The assertion of this bit can generate an interrupt to the host processor and/or the network processor.

Ordering Processor

Figure 9:
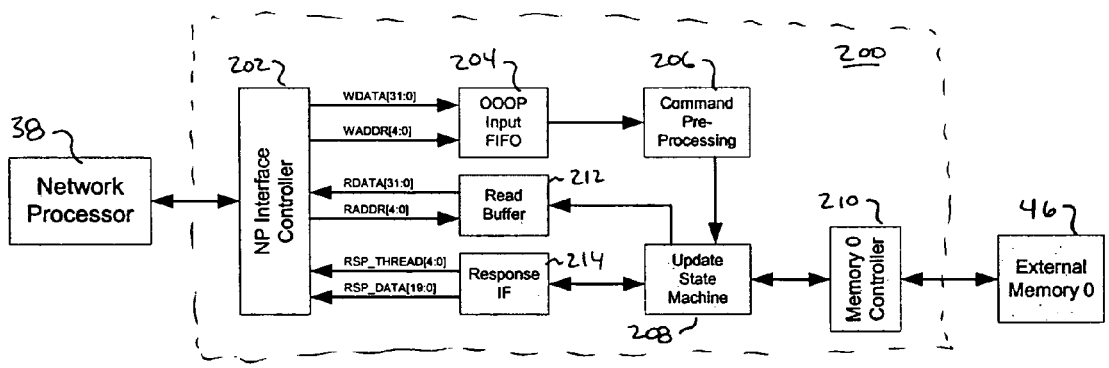
FIG. 9 is a block diagram of an ordering processor according to an embodiment of the present invention.

FIG. 9 is a block diagram of an ordering processor 200 according to an embodiment of the present invention. The ordering processor 200 is part of the processor 44 (see FIG. 2). The ordering processor 200 may also be referred to as an out-of-order processor. The ordering processor 200 includes an interface controller 202, an input FIFO 204, a command pre-processor 206, an update state machine 207, a memory controller 210, a read buffer 212, and a response interface 214.

The interface controller 202 interfaces the ordering processor circuitry to the network processor 38. The input FIFO 204 processes input data as it is received from the network processor 38. The input data from the network processor 38 is generally in the form of commands to the ordering processor 200. The input data is generally 32 bits of command data and 5 bits of address data.

The command pre-processor 206 pre-processes commands from the input FIFO 204. The update state machine 208 receives the pre-processed commands and controls the components of the ordering processor 200 to carry out the commands. The memory controller 210 interfaces the ordering processor 200 to the external memory 46 (see also FIG. 2). The read buffer 212 stores frame information to be provided to the network processor 38. The response interface 214 interfaces responsive data from the ordering processor 200 to the network processor 38 (for example, a response that a particular command has been carried out, or a response indicating an error).

The Ordering Processor 200 assists the network processor 38 in handling frames that are received out of order. When out of order frames are received, they are stored in local NP memory until the frames that need to be sent first are received. The Ordering Processor 200 assists the NP 38 by tracking the received frames, storing associated data for the frames, and alerting the NP 38 when the frames are to be sent.

The data stored in the out of order processor 200 consists of frame structures stores in queues. The OP 200 supports a variable number of queues defined by the system processor at initialization time. As frames are received, the NP 38 identifies which queue number the frame is associated with. As frames are added to a queue, their associated frame structure may be added to a linked list that is sorted by frame number. At the head of this linked list is the queue head structure.

FIG. 10 is a diagram of one embodiment of the queue head structure 220. Each of the queues supported by the OP 200 has a head structure 220 associated with it. The number of supported queues is flexible and defined by setting the QUEUE_BASE and QUEUE_TOP configuration values. The address of the head pointer of a queue is determined by bit shifting the queue number and adding it to QUEUE_BASE. Each queue head structure 220 is 64 bits.

The queue head element 220 contains a pointer to the top frame element in the frame list, a pointer valid flag, a Transmit In Progress flag, the number of the expected frame number, and the number of the next frame currently stored in the frame list. The top frame pointer and valid flag are used to find the next element in the queue or to determine if the queue is currently empty. The 'T' bit indicates that the Network Processor 38 is currently transmitting a frame. When this bit is set, no new frames can be transmitted even if they match the expected frame number, ensuring that frames are not transmitted by the network processor 38 out of order. The expected frame value in the queue head structure 220 identifies the frame number that is to be transmitted by the NP 38. The Next frame number identifies the frame number of the next frame stored in the list.

As frames are received in the network processor 38, the Pico Code passes the received frame number, the address in which the frame is stored in the egress queue, the queue number that the frame is associated with, and some NP-specific data. The OP engine 200 checks the state of the queue and compares it with the information provided with the received frame. The OP 200 determines if the frame can be transmitted or if it should be stored in the OP queue to be sent at a later time.

The OP 200 takes the address in which the frame is stored in the NP 38 and generates the address for the frame structure in the OP memory. The generated value will be compared against the FRAME_TOP configuration value to ensure that it does not exceed the allocated space in OP memory.

By using this direct address generation method, the OP 200 can look for errors where a new frame is stored at a location before the frame that was previously stored there has been transmitted. This also eliminates the need for a free frame structure queue.

Once the address of the received frame buffer and the active state of the frame are checked, the OP 200 updates the frame structure associated with the NP memory location.

FIG. 11 is a diagram of a frame structure 222 according to an embodiment of the present invention. Each frame entry structure 222 contains a pointer to the next frame structure in the linked list, a pointer valid flag, the frame number of the next frame in the list, the frame number that this structure refers to, a frame active flag, and associated data for the frame. A 20-bit buffer address and 20-bit BCI data field are also stored.

The next frame value stores the frame number of the next frame in the list and is used if the next pointer valid flag is set. The frame active bit determines if the buffer location currently stores a frame waiting to be transmitted or if the buffer is currently empty. The buffer address and BCI data fields store NP-specific information that was passed along with the frame when the "Frame Received" command was issued. This data is passed back to the NP when the "Frame Poll" or "Frame Pop" commands are issued.

Ordering Processor Commands

The Ordering Processor 200 supports five separate commands that are used at various times during the operation of the OP queue. All of these commands are processed in the order that they are received, and each command has an associated NP response with it. Once a thread issues a command, it will wait for a response to be sent when the command has been completed. The five commands supported by the OP 200 are described below.

FIG. 12 is a diagram showing the format of the "Init Queue" command 224. The "Init Queue" command is used to initialize the state of a specific OP queue. This command is used to reset the next frame field in the addressed queue as well as to determine if the queue needs to be cleaned up. If the queue is currently empty, the OP engine 200 will update the "Next Frame" field and send an "Init Success" response to the NP 38. The queue may then be used to store received frames. If they identified queue currently has frames in its linked list, an "Init Fail" response will be sent to the NP 38.

FIG. 13 is a diagram showing the format of the "Frame Pop" command 226 and related buffer data 228. The "Frame Pop" command is used to pull frame entries off of an OP queue. Each time the NP 38 issues this command, a response will be sent indicating if the queue is empty or if a frame has been popped off of the queue. If there are any frames currently on the identified queue, the first frame structure in the list is read and its frame information is moved to the read buffer for the calling thread. The active bit for the 'popped' frame is then cleared.

According to one embodiment, the read buffer data 228 is read in a shape of three words with the first 32-bit value being a NULL value. The shape of three-word read is used to increase the cycle time so the appropriate thread data can be routed to the read interface.

FIG. 14 is a diagram showing the format of the "Frame Received command 230. The "Frame Received" command is issued each time the NP 38 receives a frame that requires out of order processing. The NP 38 passes the queue number for the frame, the received frame number, the address of the NP storage location, and some associated data. The OP engine 200 accesses the identified queue and determines if the frame should be stored for later processing or if the NP can immediately send the frame. If the frame can be sent, a "Frame TX" response is sent, the NP will then transmit the frame, and the NP will follow up with a "Frame Transmit" command indicating that the frame has been transmitted. A "Frame Store" response is sent if the frame is to be stored for later transmission. If the OP 200 detects an error during its operation, it sends a "Frame Error" response and sets an error flag. No processing on the frame is generally performed if an error is detected.

FIG. 15 is a diagram showing the format of the "Frame Poll" command 232 and related buffer data 234. The "Frame Poll" command is used to check to see if the expected frame is currently stored in the linked list and ready for transmission. Each time the NP calls this command, a response is be sent indicating if the expected frame is ready to be transmitted. If the frame can be transmitted, its frame structure is read and its frame information is moved to the read buffer for the calling thread. The active bit for the frame is cleared. If no frame is ready to be transmitted, a "No Frame" response will be sent.

The read buffer data 234 is read in a shape of three words with the first 32-bit value being a NULL value. The shape of three-word read is used to increase the cycle time so the appropriate thread data can be routed to the read interface.

Figure 16:
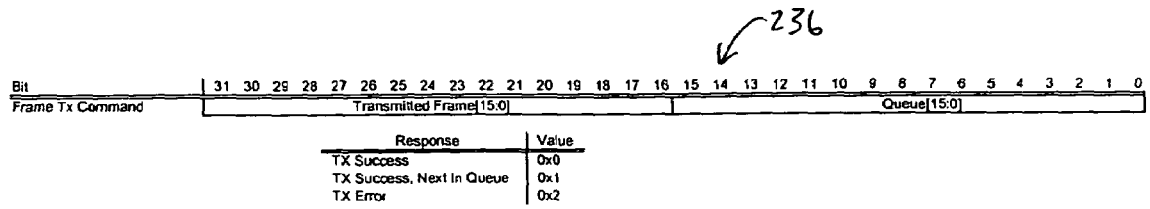
FIG. 16 is a diagram of a frame transmit command used by the ordering processor of FIG. 9.

FIG. 16 is a diagram showing the format of the "Frame Transmit" command 236. The "Frame Transmit" command is used to indicate that the transmission of the expected frame has been completed successfully. The NP 38 issues this command following a "Frame Received" command where it was told to transmit the frame, or following a successful "Frame Poll" command. When the OP engine 200 receives this command, it increments the expected frame value. The response to this command will be one of three values. The first two values indicate no error and encode whether or not the next frame to be transmitted is currently available in the buffer. If the next frame is available, the NP 38 will follow up with a "Frame Poll" command to get the frame information. If the frame value provided with the "Frame Transmit" command does not match the frame number that the OP 200 expected to be transmitted, a "TX Error" response is sent to the NP 38 and the corresponding error bit is set.

Ordering Processor Operation

This section describes the internal operation that occurs within the OP engine 200 when each of the five supported commands are received. As the commands are received by the NP interface 202, they are added to the input command queue 204. The depth of the command queue 204 makes it impossible for the buffer to overflow if the NP software operates properly. If the buffer overflows for any reason and a command is lost, the CMD_LOST flag will be asserted. The assertion of this signal has the ability to generate an interrupt to the host processor or network processor 38. The address presented on the NP interface 202 is used to determine the command and owner thread. Bits 9-7 encode the command to be performed and bits 6-2 encode the thread that is performing the command. Bits 1-0 are always zero for all commands except the "Frame Received" command. For the "Frame Received" command, the value encode in these bits will be 0, 1 or 2 depending on which long word of the command is being written.

Figure 17:
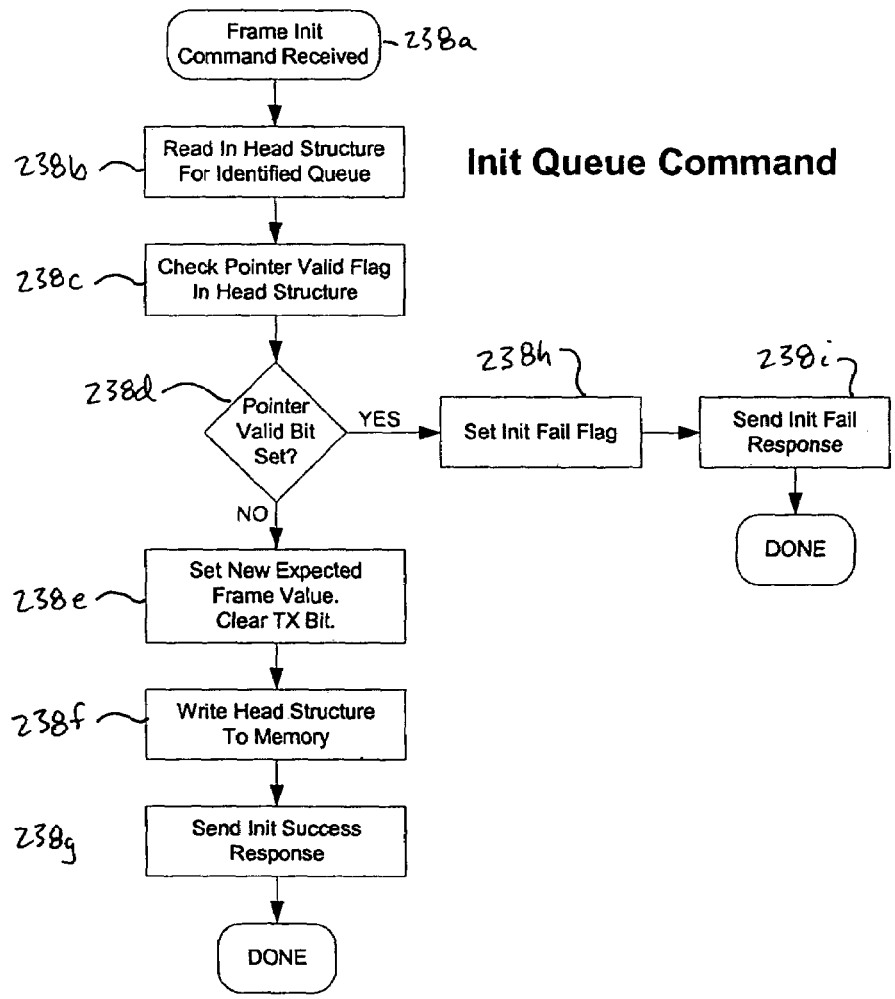
FIG. 17 is a flow diagram for the queue initialization command executed by the ordering processor of FIG. 9.

FIG. 17 is a flow diagram for the "Init Queue" command. As described earlier, this command checks the queue to determine if it is empty, sets the new expected frame value, and responds with the appropriate response. The "Init Fail" status bit may be set during the operation of this command. The setting of this bit has the ability to generate an interrupt to the host processor or the network processor.

In step 238*a*, the ordering processor 200 receives the "Init Queue" command. In step 238*b*, the update state machine 208 works with the memory controller 210 to read in the head structure for the identified queue. In step 238*c*, the update state machine 208 checks the pointer valid flag in the head structure. In step 238*d*, the update state machine 208 checks whether the pointer valid bit is set. If not, in step 238*e*, the update state machine 208 sets the new expected frame value and clears the TX bit. In step 238*f*, the update state machine 208 works with the memory controller 210 to write the head structure to the memory 46. In step 238*g*, the update state machine sends the initialization success response to the network processor 38 via the response interface 214.

If step 238*d* determines that the pointer valid bit is set, in step 238*h* the update state machine 208 sets the initialization failure flag. In step 238*i*, the update state machine 208 sends the initialization failure response to the network processor 38 via the response interface 214.

Figure 18:
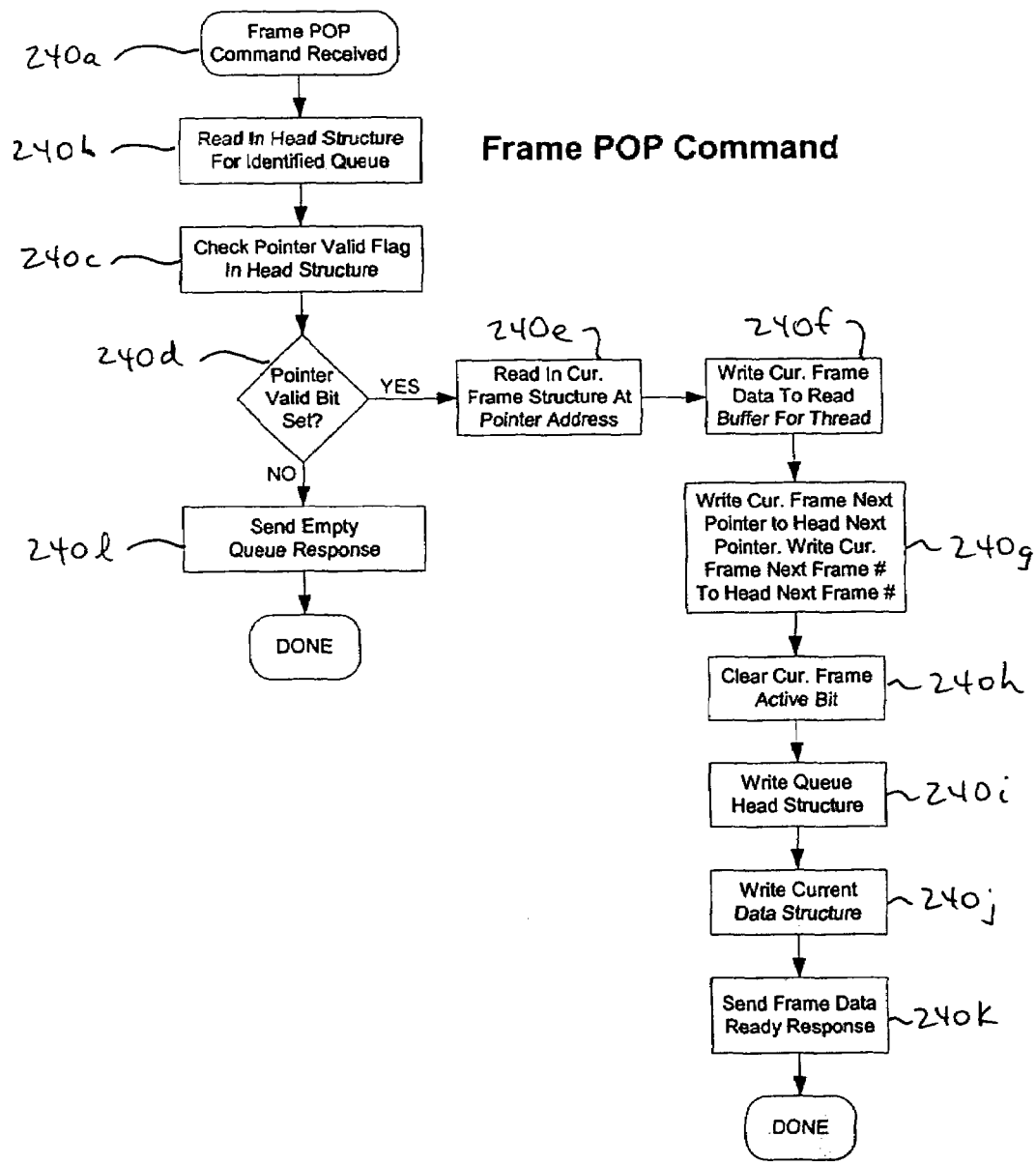
FIG. 18 is a flow diagram for the frame pop command executed by the ordering processor of FIG. 9.

FIG. 18 is a flow diagram for the "Frame Pop" command. This command allows the NP 38 to remove entries from a Queue. Any frame entries 'popped' from the queue have their active bit cleared.

In step 240*a*, the ordering processor 200 receives the "Frame Pop" command. In step 240*b*, the update state machine 208 works with the memory controller 210 to read in the head structure for the identified queue. In step 240*c*, the update state machine 208 checks the pointer valid flag in the head structure. In step 240*d*, the update state machine 208 verifies whether the pointer valid bit is set. If so, in step 240*e*, the update state machine 208 works with the memory controller 210 to read in the current frame structure at the pointer address. In step 240*f*, the update state machine 208 writes the current frame data to the read buffer 212 for the thread. In step 240*g*, the update state machine 208 writes the current frame next pointer to the head structure next pointer. The update state machine 208 writes the current frame next frame number to the head structure next frame number. In step 240*h*, the update state machine 208 clears the current frame active bit. In step 240*i*, the update state machine 208 works with the memory controller 210 to write the queue head structure to the memory 46. In step 240*j*, the update state machine 208 works with the memory controller 210 to write the current data structure to the memory 46. In step 240*k*, the update state machine sends the frame data ready response to the NP 38. The process is then complete for this command.

Step 240*l* results from step 240*d* when the pointer valid bit is not set. In step 240*l*, the update state machine 208 sends the empty queue response to the NP 38. The process is then complete for this command.

Figure 19:
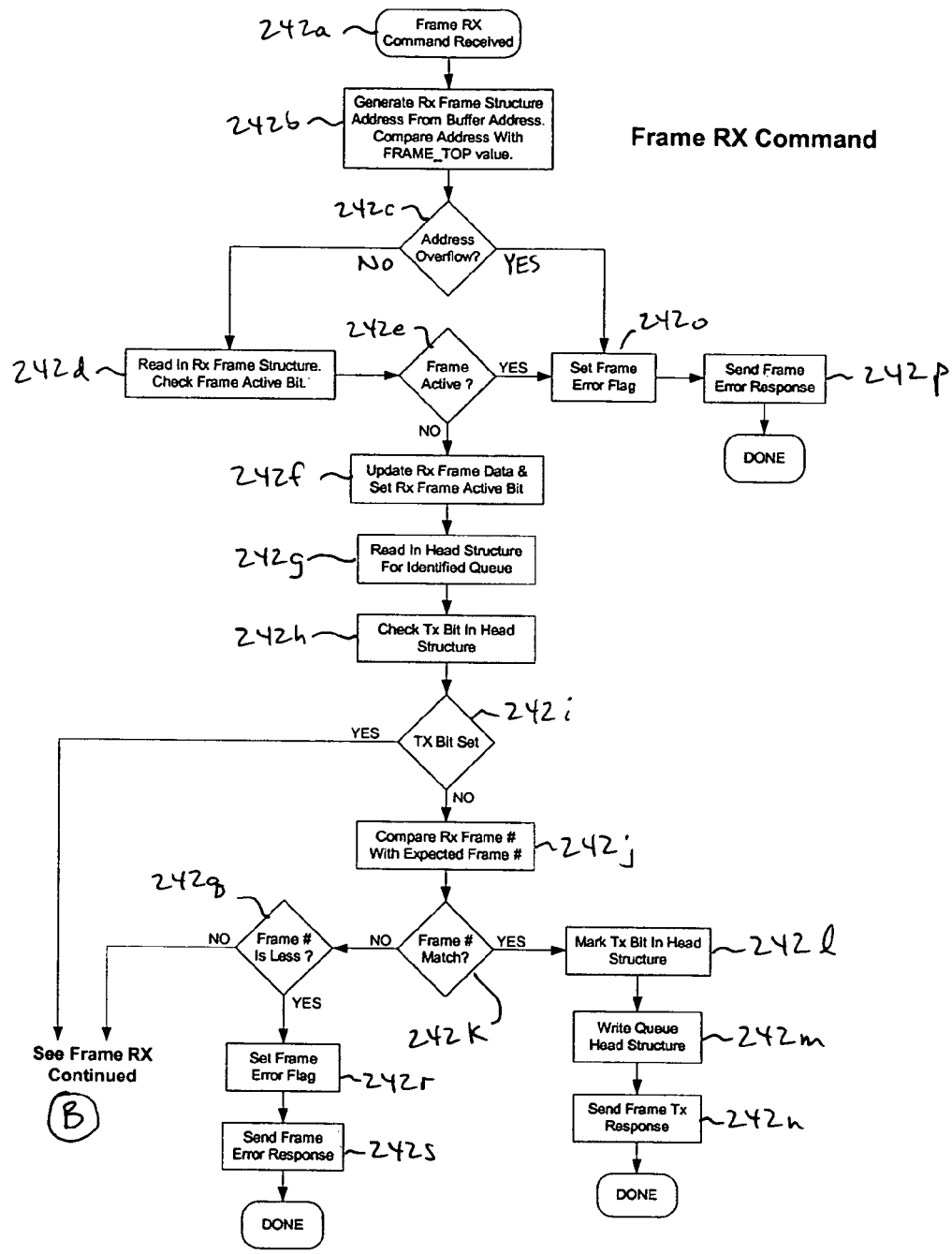
FIG. 19 is a flow diagram for the first part of the frame received command executed by the ordering processor of FIG. 9.
Figure 20:
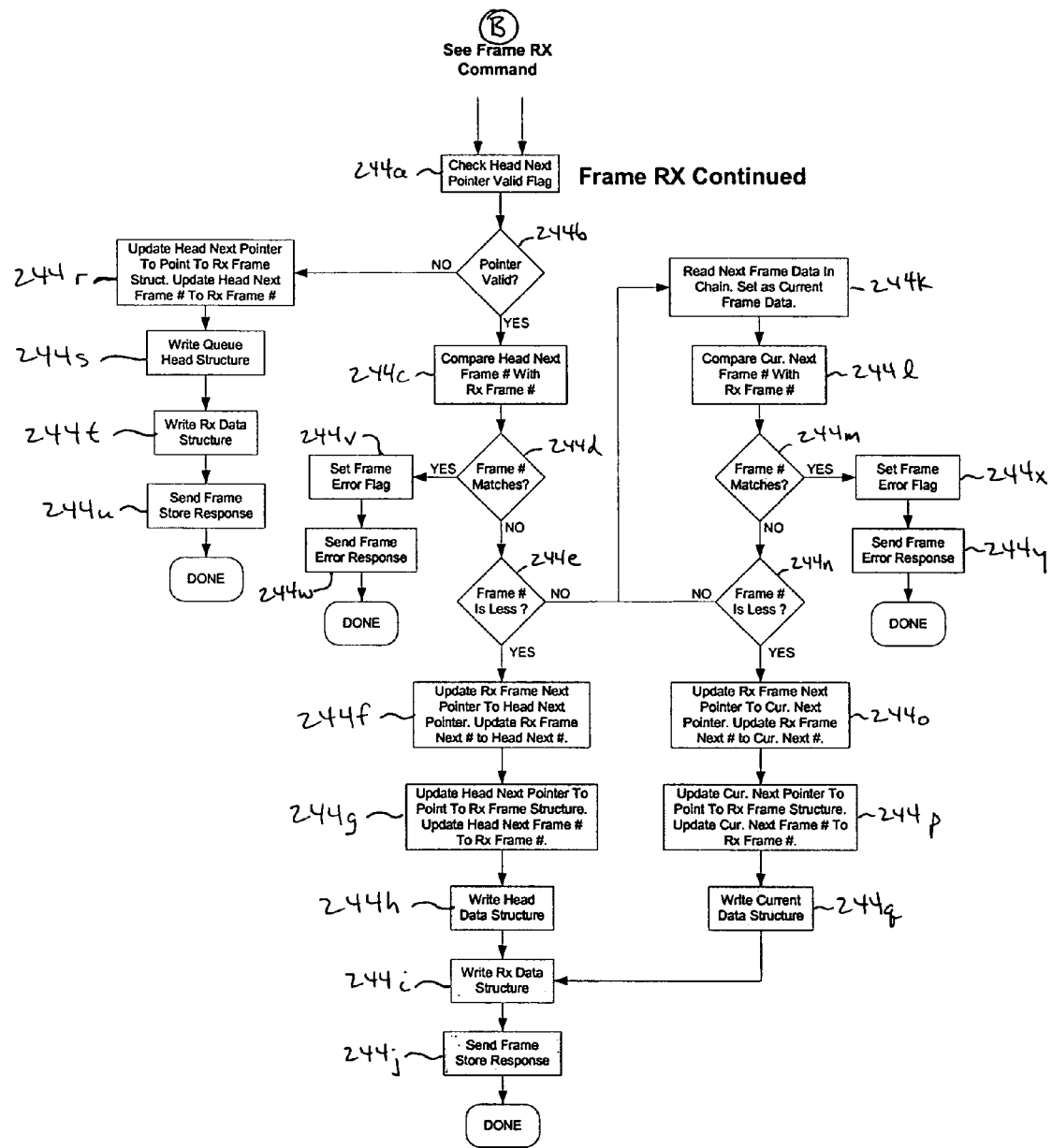
FIG. 20 is a flow diagram for the second part of the frame received command executed by the ordering processor of FIG. 9.

FIGS. 19-20 are a flow diagram for the "Frame Received" command. This command results in a frame being transmitted by the NP 38 or the insertion of the received frame in the identified queue. The "Frame Received" command asserts the FRAME_ERR bit if an error occurs during the processing of the command. This bit has the ability to assert an interrupt to the host processor or network processor 38.

The address of the frame structure for the received frame, FRAME_ADDR, is generated from the buffer address provided along with the "Frame Received" command, BUFF_ADDR. The equation below uses the buffer address mask, BUFF_MASK, the buffer address shift, BUFF_SHIFT and the frame structure base address, FRAME_BASE to generate the frame structure address. The resulting value is then compared with the frame structure top address, FRAME_TOP.

OFF_ADDR=(BUFF_ADDR&BUFF_MASK)
>>BUFF_SHIFT

FRAME_ADDR=(OFF_ADDR<<2)+FRAME_BASE

In general, the flowchart of FIG. 19 determines if the frame is to be transmitted for stored, and the flowchart of FIG. 20 performs the insertion of the frame structure into identified queue.

In step 242*a*, the ordering processor 200 receives the "Frame Received" command. In step 242*b*, the update state machine 208 generates the received frame structure address from the buffer address. The update state machine 208 compares the address with the FRAME_TOP value. In step 242*c*, the update state machine 208 determines whether there is an address overflow. If not, in step 242*d*, the update state machine 208 reads in the received frame structure. In step 242*e*, the update state machine 208 determines whether the frame is active. If not, in step 242*f*, the update state machine 208 updates the received frame data and sets the received frame active bit. In step 242*g*, the update state machine 208 reads in the head structure for the identified queue. In step 242*h*, the update state machine 208 checks the TX bit in the head structure. In step 242*i*, the update state machine 208 determines whether the TX bit is set. If not, in step 242*j*, the update state machine 208 compares the received frame number with the expected frame number. In step 242*k*, the update state machine 208 verifies whether the frame numbers match. If so, in step 242*l*, the update state machine 208 marks the TX bit in the head structure. In step 242*m*, the update state machine 208 works with the memory controller 210 to write the queue head structure to the memory 46. In step 242*n*, the update state machine 208 sends the frame transmit response to the NP 38. The process is then complete for that command.

Step 242*o* results when step 242*c* has identified an address overflow. In step 242*o*, the update state machine 208 sets the frame error flag. In step 242*p*, the update state machine sends the frame error response to the NP 38. The process is then complete for that command.

Step 242*q* results when step 242*k* has determined the frame numbers do not match. In step 242*q*, the update state machine 208 examines whether the received frame number is less than the expected frame number. If so, in step 242*r* the update state machine 208 sets the frame error flag. In step 242*s*, the update state machine 208 sends the frame error response to the NP 38. The process is then complete for that command.

If the TX bit is determined from step 242*i* to be set, or if the received frame number is not less than the expected frame number in step 242*q*, the process moves to FIG. 20.

In step 244*a*, the update state machine 208 checks the head next pointer valid flag. In step 244*b*, the update state machine 208 determines whether the pointer is valid. If so, in step 244*c*, the update state machine 208 compares the head next frame number with the received frame number. In step 244*d*, the update state machine 208 determines whether the frame numbers match. If not, in step 244*e*, the update state machine 208 determines whether the frame number is less. If so, in step 244*f*, the update state machine 208 updates the received frame next pointer to the head next pointer, and updates the received frame next number to the head next number. In step 244*g*, the update state machine 208 updates the head next pointer to point to the received frame structure, and updates the head next frame number to the received frame number. In step 244*h*, the update state machine 208 works with the memory controller 210 to write the head data structure to the memory 46. In step 244*i*, the update state machine 208 works with the memory controller 210 to write the received data structure to the memory 46. In step 244*j*, the update state machine 208 sends the frame store response to the NP 38. The process is then complete for that command.

Step 244*k* results from step 244*e* (or step 244*n*, see below) when the frame number is not less. In step 244*k*, the update state machine 208 reads the next frame data in the chain, and sets the next frame data read as the current frame data. In step 244*l*, the update state machine 208 compares the current next frame number with the received frame number. In step 244*m*, the update state machine determines whether the frame numbers match. If not, in step 244*n*, the update state machine determines whether the frame number is less. If so, in step 244*o*, the update state machine 208 updates the received frame next pointer to the current next pointer, and updates the received frame next number to the current next number. In step 244*p*, the update state machine 208 updates the current next pointer to point to the received frame structure, and updates the current next frame number to the received frame number. In step 244*q*, the update state machine 208 works with the memory controller 210 to write the current data structure to the memory 46. The process then moves to step 244*i*.

Step 244*r* results from step 244*b* when the pointer is not valid. In step 244*r*, the update state machine 208 updates the head next pointer to point to the received frame structure, and updates the head next frame number to the received frame number. In step 244*s*, the update state machine 208 works with the memory controller 210 to write the queue head structure to the memory 46. In step 244*t*, the update state machine 208 works with the memory controller 210 to write the received data structure to the memory 46. In step 244*u*, the update state machine 208 sends the frame store response to the NP 38. The process is then complete for that command.

Step 244*v* results from step 244*d* when the frame numbers do not match. In step 244*v*, the update state machine 208 sets the frame error flag. In step 244*w*, the update state machine 208 sends the frame error response to the NP 38. The process is then complete for that command.

Step 244*x* results from step 244*m* when the frame numbers do not match. In step 244*x*, the update state machine 208 sets the frame error flag. In step 244*y*, the update state machine 208 sends the frame error response to the NP 38. The process is then complete for that command.

Figure 21:
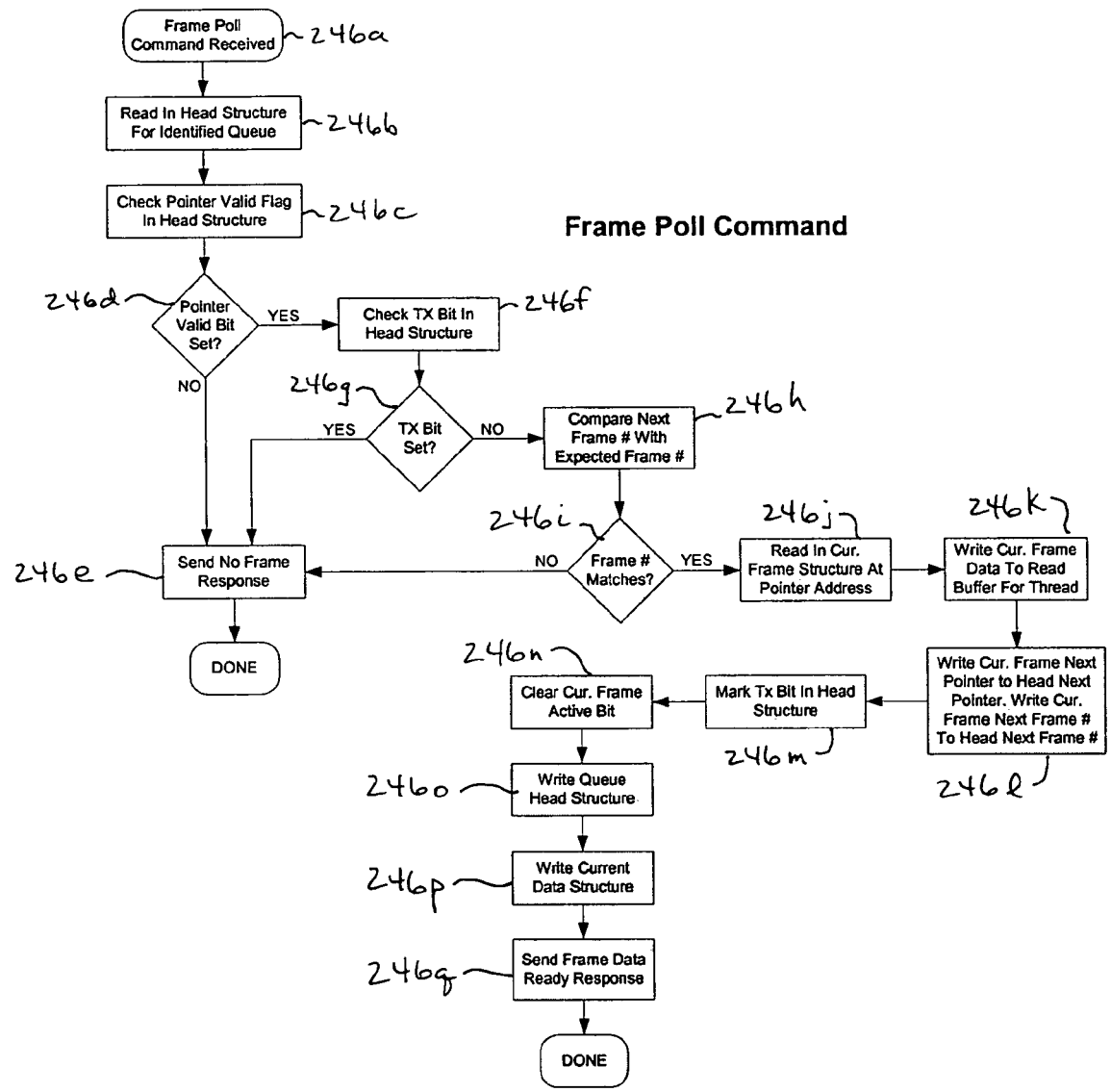
FIG. 21 is a flow diagram for the frame poll command executed by the ordering processor of FIG. 9.

FIG. 21 is a flow diagram for the "Frame Poll" command. In this command, the OP engine 200 checks to see if the next frame can be sent. If it can be sent, the frame information is moved to the read buffer for the requesting thread.

In step 246*a*, the ordering processor 200 receives the frame poll command. In step 246*b*, the update engine 208 works with the memory controller 210 to read in the head structure for the identified queue from the memory 46. In step 246*c*, the update state machine 208 checks the pointer valid flag in the head structure. In step 246*d*, the update state machine 208 determines whether the pointer valid bit is set. If not, in step 246*e*, the update state machine 208 sends the no frame response to the NP 38. The process is then complete for that command.

Step 246*f* results from step 246*d* when the pointer valid bit is set. In step 246*f*, the update state machine 208 checks the transmit bit in the head structure. In step 246*g*, the update state machine 208 determines whether the transmit bit is set. If so, the process moves to step 246*e*. If not, in step 246*h*, the update state machine 208 compares the next frame number with the expected frame number. In step 246*i*, the update state machine 208 determines whether the frame numbers match. If not, the process moves to step 246*e*. If so, in step 246*j*, the update state machine 208 works with the memory controller 210 to read in the current frame structure at the pointer address from the memory 46. In step 246*k*, the update state machine 208 writes the current frame data to the read buffer 212 for the thread. In step 246*l*, the update state machine 208 writes the current frame next pointer to the head next pointer, and writes the current frame next frame number to the head next frame number. In step 246*m*, the update state machine 208 marks the transmit bit in the head structure. In step 246*n*, the update state machine 208 clears the current frame active bit. In step 246*o*, the update state machine 208 works with the memory controller 210 to write the queue head structure to the memory 46. In step 246*p*, the update state machine 208 works with the memory controller 210 to write the current data structure to the memory 46. In step 246*q*, the update state machine 208 sends the frame data ready response to the NP 38. The process is then complete for that command.

Figure 22:
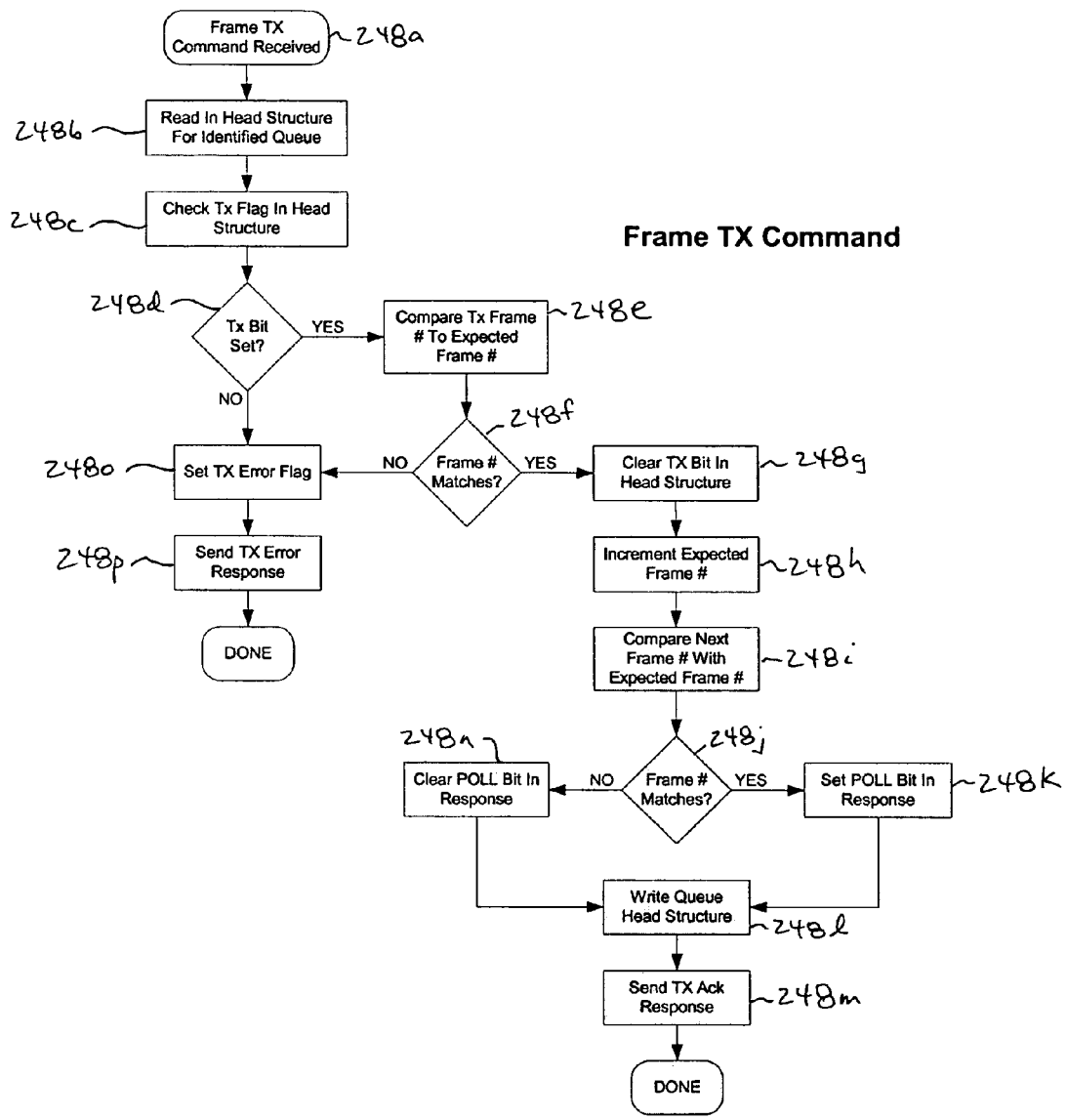
FIG. 22 is a flow diagram for the frame transmit command executed by the ordering processor of FIG. 9.

FIG. 22 is a flow diagram for the "Frame Transmit" command. This command indicates to the OP engine 200 that the expected frame has been transmitted and the expected frame value can be incremented. The OP engine 200 checks to make sure the transmitted frame value matches the expected frame value and that the transmit flag has been set. If the transmit flag has not been set or the transmitted frame number does not match the expected frame number, the transmit error flag will be set. This flag has the ability to generate and interrupt to the host processor or the network processor 38.

In step 248*a*, the ordering processor 200 receives the frame transmit command from the NP 38. In step 248*b*, the update state machine 208 works with the memory controller 210 to read in the head structure for the identified queue from the memory 46. In step 248*c*, the update state machine 208 checks the transmit flag in the head structure. In step 248*d*, the update state machine 208 determines whether the transmit bit has been set. If so, in step 248*e*, the update state machine 208 compares the transmitted frame number to the expected frame number. In step 248*f*, the update state machine determines whether the frame numbers match. If so, in step 248*g*, the update state machine 208 clears the transmit bit in the head structure. In step 248*h*, the update state machine increments the expected frame number. In step 248*i*, the update state machine 208 compares the next frame number with the expected frame number. In step 248*j*, the update state machine 208 determines whether the frame numbers match. If so, in step 248*k* the update state machine 208 sets the poll bit in response. In step 248*l*, the update state machine works with the memory controller 210 to write the head structure to the memory 46. In step 248*m*, the update state machine 208 sends the transmit acknowledgement response to the NP 38. The process is then complete for that command.

Step 248*n* results from step 248*j* when the frame numbers do not match. In step 248*n*, the update state machine clears the poll bit in response. The process then moves on to step 248*l*.

Step 248*o* results from step 248*d* when the transmit bit is not set, or from step 248*f* when the frame numbers do not match. In step 248*o*, the update state machine 208 sets the transmit error flag. In step 248*p*, the update state machine 208 sends the transmit error response to the NP 38.

Ordering Processor Initialization

Software starts the initialization process by setting the INIT_RST bit in the control register. This bit holds the internal state machines in a reset state while the ISA configuration registers are set. Software then configures the QUEUE_BASE and QUEUE_TOP registers for the queue head memory. Each queue head entry consumes two address locations.

Software then configures the FRAME_BASE and FRAME_TOP registers for the frame structure memory. Each frame structure entry consumes four address locations. Along with these two variables, software also sets the BUFF_MASK and BUFF_SHIFT configurations used to generate the frame structure address from the buffer address provided by the network processor 38.

Once the configuration values have been set, software clears the INIT_RST bit and allows the OP initialization to complete. When initialization has completed, the OOOP_INIT flag in the OP status register clears.

Ordering Process Status

The ordering processor 200 has a number of status bits that indicate the state of the internal logic.

OOOP_INIT—This flag may be set when the OP is in INIT mode and should not be accessed over the Z0 interface 42.

CMD_LOST—This flag may be set when a command has been written over the Z0 interface 42 and did not make it into the command buffer 204. The assertion of this bit may generate an interrupt to the host processor and/or the network processor 38.

INIT_FAIL—This flag may be set when an "Init Queue" command has been issued and the queue is not empty. The assertion of this bit may generate an interrupt to the host processor and/or the network processor 38.

FRAME_ERR—This flag may be set when a "Frame Received" command has been issued and a processing error occurs. The assertion of this bit may generate an interrupt to the host processor and/or the network processor 38.

TX_ERR—This flag may be set when a "Frame Transmit" command has been issued and a processing error occurs. The assertion of this bit may generate an interrupt to the host processor and/or the network processor 38.

Timer Manager

FIG. 23 is a block diagram of a timer manager 300 according to an embodiment of the present invention. The timer manager 300 is part of the processor 44 (see FIG. 2). The timer manager 300 includes an interface controller 302, a command buffer and decoder 304, a main controller 306, a remover 308, a first timer interval manager 310, a second timer interval manager 312, an arbiter 314, a memory controller 316, an expired queue manager 318, and an expire FIFO 320.

The interface controller 302 interfaces the timer manager circuitry to the network processor 38. The command buffer and decoder 304 processes input data as it is received from the network processor 38. The input data from the network processor 38 is generally in the form of commands to the timer manager 300. The input data is generally 32 bits of command data and 8 bits of address data.

The main controller 306 controls the components of the timer manager 300 to implement the commands from the NP 38 and to manage the timers. The remover 308 removes expired timers.

The first timer interval manager 310 and second timer interval manager 312 each manage a different timer interval. According to the embodiment of FIG. 23, two intervals are supported. Other embodiments may implement more or less numbers of intervals as desired. The timer interval managers 310 and 312 manage doubly-linked lists of timers (as more fully described below). The timer interval managers 310 and 312 each include a memory for storing various timer structures, including a currently active timer, a previously active timer, and optionally a new timer to be inserted into the list. These concepts are more fully described below.

The arbiter 314 arbitrates access to the memory 50 (via the memory controller 316) between the remover 308, the first timer interval manager 310, the second timer interval manager 312, and the expired queue manager 318. It is undesired for two of such components to simultaneously attempt to access the memory 50. The memory controller controls memory access between the elements of the timer manager 300 and the memory 50.

The expired queue manager 318 manages placing expired timers in the expire FIFO 320. The expire FIFO 320 stores expired timers until the expired timers have been accessed by the NP 38.

The Timer Manager (TIMM) 300 eliminates the software overhead associated with updating the timers within the NP 38 by implementing and managing them inside the co-processor 44. Software can start, stop and restart a timer within the TIMM 300 with a simple write to the Z0 interface 42. When a timer expires, it is placed on the expire queue 320 for software to come in to read.

These timers can be started at anytime, run in parallel, have different timeout values and can all expire at the same time. Each timer is implemented using a default time period of either 100 ms or 1 sec (corresponding to the first and second timer interval managers 310 and 312). When a timer is started, a loop count is included. The loop count indicates how many time periods will pass before the timer expires.

FIG. 24 is a diagram of a timer record 330. The timer records 330 are stored in the external memory 50 in a 128-bit timer record. Each timer record 330 contains up and down pointers that are used to create a doubly linked list of active timer records. The pointer valid flags are used to indicate the validity of the two pointers.

The original loop count value is stored in the timer record 330 to be used by the "Restart Timer" command. This allows the NP 38 to restart the timer without passing the original loop count associated with the timer.

The state bits, E & A, indicate if the timer is currently Idle, Active or Expired. The 16-bit timeout handler is a value that is passed to the NP software if the timer expires. The loop count value is preloaded when the timer is created and is decremented once each internal period. When this count reaches zero, the timer is expired and is moved to the expired queue. The restart bit indicates if a timer restart operation is to be preformed the next time the timer expires. Finally, the "Interval Time" value contains the 30-bit timestamp of when the timer interval will be complete. This value is compared against the free running timer to determine if the loop count value should be decremented.

FIG. 25 is a diagram of a doubly-linked list 332 of timers. Each of the timer interval managers 310 and 312 manage a respective doubly-linked list of timers. The doubly linked list 332 includes a top timer, an end timer, and various active timers. The top timer is the timer currently being managed. The end timer is the timer that was previously being managed. The various active timers will become the top timer, respectively, as the timer interval manager moves through the doubly-linked list. Within each timer structure (see also FIG. 24), the up pointer U points to the "previous" timer in the doubly-linked list, and the down pointer D points to the "next" timer in the doubly-linked list.

When a timer is created, it is added to a doubly linked list in the appropriate interval queue. When a new timer is created, its expire time value is generated by adding the interval time to the current value of the free running time clock. It is then added to the end of the doubly linked list. Adding records in this fashion ensures that the entry at the top of the list will always be the first entry to expire. A copy of the top entry is stored in the timer manager and its expire time value is always compared against the current timestamp.

When the timer value indicates an expired event, the loop count is checked. If the loop count is not zero, then it will be decremented, and a new expire time value will be created. The timer manager 300 then loads the next entry in the circular list into its internal memory and starts comparing the timestamp of the next entry with the free running counter. If the loop count is zero, the timer will be removed from the linked list and added to the expired queue.

A more detailed explanation of the operation of the timer manager and its commands are described below.

Timer Manager Commands

The Timer Manager 300 supports a series of commands that are used to start and stop timers as well as retrieve and acknowledge timers that have been placed on the expired queue 320. The start timer, stop timer and expired acknowledge commands have an associated response. The address space for each command is four Z0 address locations wide, with bits 1-0 selecting the long word of the command. For commands that only require a single long word, the high long words are ignored and can be left out of the command. Address bits 6-2 are used to identify the thread that is issuing the commands. This information is used to direct the response back to the calling thread.

FIG. 26 is a diagram of the structure of the "Start Timer" command 334 and its response. The "Start Timer" command is used to activate an idle timer and place it on the appropriate timer queue. The "Start Timer" command consists of a write of a shape of 3 to the Z0 interface. Bits 15-0 of the first long word written identify the timer that is to be started. Bit 16 of the first long word identify the timer internal as either 100 ms or is. Bits 17-0 of the second long word written contain a loop count value. This value defines the number of 'INT' time intervals must pass before the timer expires. Bits 15-0 of the third long word contain a timeout handler that is passed back to software if the timer expires before it has been stopped.

If the "Start Timer" command is successful, a "Start Ack" response is issued to the calling thread. If the timer is already running or if the timer is out of the range of configured timers, then a "Start Error" response is issued to the calling thread, and the "TIMER_ERR" error bit is set.

FIG. 27 is a diagram of the structure of the "Stop Timer" command 336 and its response. The "Stop Timer" command is used to stop a timer that is currently running. The stopped timer is removed from the timer queue and is marked as idle. The "Stop Timer" command consists of a write of a shape of 1 to the Z0 interface. Bits 15-0 of the long word written identify the timer that is to be stopped. If the "Stop Timer" command is successful, a "Stop Ack" response is issued to the calling thread. If the timer is not running or if the timer is out of the range of configured timers, then a "Stop Error" response is issued to the calling thread, and the "TIMER_ERR" error bit is set. If the timer is currently in the "Expired" state, then a "Stop Expired" response is sent.

FIG. 28 is a diagram of the structure of the "Restart Timer" command 338 and its response. The "Restart Timer" command is used to restart a timer that is currently running. If the timer has not expired, the loop count is reset to its initial value. The timer entry may not be moved from its current location in the active timer list. Because the timer entry is not moved in the list, the first decrement of the loop count may come earlier than the time interval. The "Restart Timer" command consists of a write of a shape of 1 to the Z0 interface. Bits 15-0 of the long word written identify the timer that is to be restarted. If the "Restart Timer" command is successful, then a "Restart Ack" response may be sent to the NP 38. If the timer is not currently running, then a "Restart Error" response may be sent and the "Timer Error" flag may be set. If the timer is currently in the "Expired" state, then a "Restart Expired" response may be sent to the NP 38 indicating that the timer cannot be restarted.

FIG. 29 is a diagram of the structure of the "Read Expired" command 340. The "Read Expired" command allows the NP 38 to retrieve one or more timers that have expired. A read expired command consists of a 64-bit read, shape=2, from the Z0 interface. Each read may return the next entry in the expired queue. The first 32-bit value read will always be NULL. If an entry read from the expired queue is valid, bit 16 in the second 32-bit value will be set. Bits 15-0 of the second 32-bit value contain the timer ID that has expired. If no more entries are available on the expired queue, bit 16 of the second 32-bit value will be clear. Reading an entry from the expired queue does not change the state of the expired timer. In order to return the expired timer back to "Idle", a "Clear Expired" command should be issued.

FIG. 30 is a diagram of the structure of the "Clear Expired" command 342 and its response. The "Clear Expired" command is issued following a read from the expired queue 320. When a timer expires, it is added to the expired queue 320 and set in the "Expired" state. It stays in this state until the NP 38 issues an "Clear Expired" command, indicating that the expiration has been acknowledged and that the appropriate actions have been taken. The "Clear Expired" command consists of a write in the shape of '1' to the "Clear Expired" command address. Bits 15-0 of the written data contain the timer ID of the timer that will be returned to the "Idle" state. If the identified timer is not in the "Expired" state, a "Clear Error" response will be sent to the NP 38, and the "TIMER_ERR" error bit will be set. Otherwise a "Clear Ack" response will be sent.

Timer Manager Operation

This section describes the internal operation that occurs within the TIMM engine 300 when each of the supported commands is received. As the commands are received by the NP interface of the Pico Co-Processor 44 they are added to the input command queue. The depth of the command queue makes it impossible for the buffer to overflow if the NP software operates properly. If the buffer overflows for any reason and a command is lost, the CMD_LOST flag will be asserted. The assertion of this signal has the ability to generate an interrupt to the host processor or network processor 38.

The address presented on the NP interface is used to determine the command and owner thread. Bits 8-7 encode the command to be performed, and bits 6-2 encode the thread that is performing the command. Bits 1-0 is always zero for all commands except the "Start Timer" command. For the "Start Timer" command, the value encode in these bits will be 0 or 1 depending on which long word of the command is being written.

Figure 31:
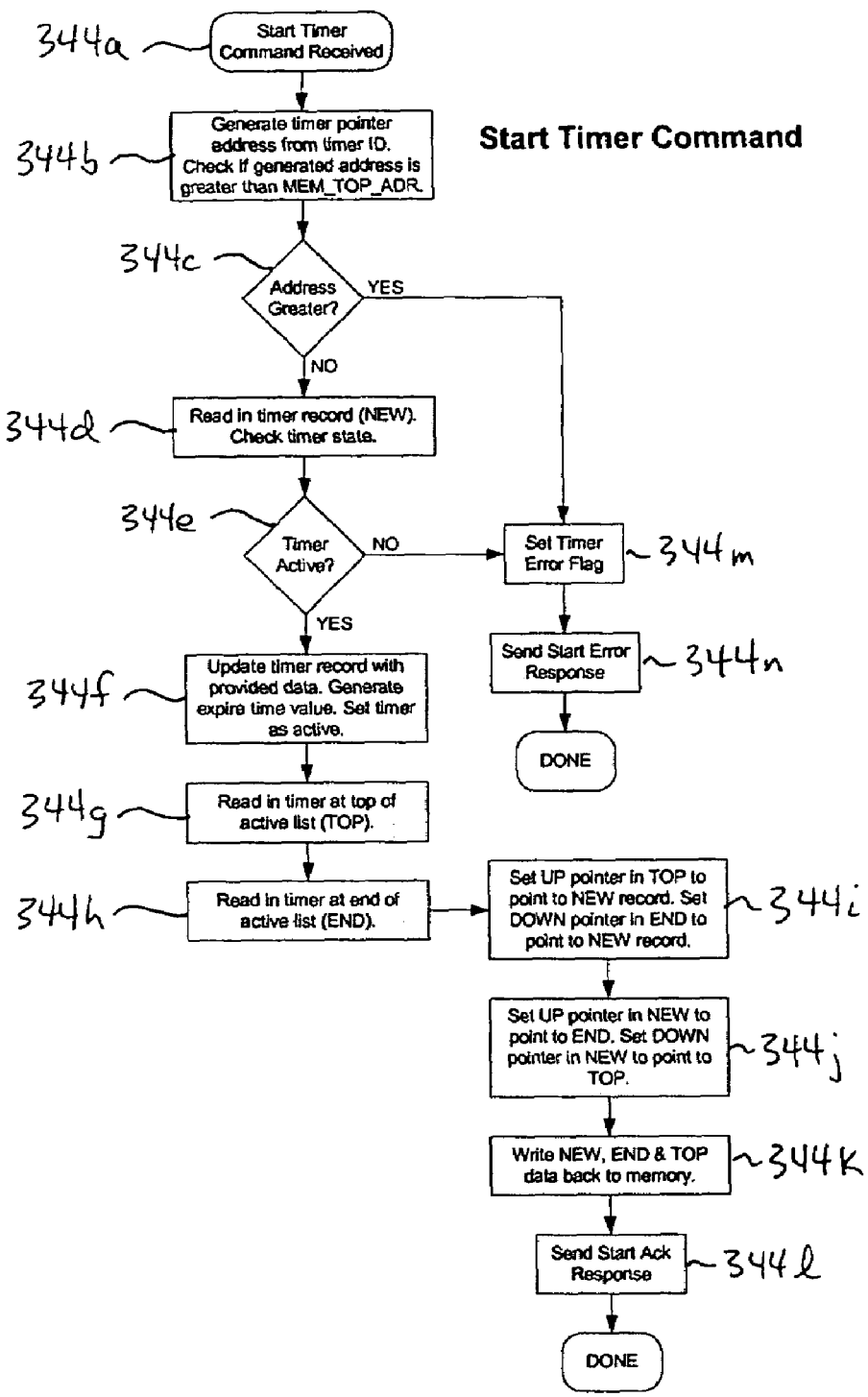
FIG. 31 is a flow diagram of the start timer command executed by the timer manager of FIG. 23.

FIG. 31 is a flow diagram of the "Start Timer" command. As described earlier, this command starts a new timer and adds it to the active timer list. An error response is sent if the identified timer is not currently in the "Idle" state or if the indicated timer is out of range. The main controller 306 generally performs the "Start Timer" command.

In step 344a, the timer manager 300 receives the start timer command from the NP 38. In step 344b, the timer manager 300 generates a timer pointer address from the timer ID, and checks if the generated address is greater than MEM_TOP_ADR. In step 344c, the timer manager 300 determines whether the address is greater. If not, in step 344d, the timer manager 300 works with the arbiter 314 and memory controller 316 to read in the timer record ("NEW") from the external memory 50 and checks the timer state. In step 344e, the timer manager 300 determines whether the timer is active. If so, in step 344f, the timer manager 300 updates the timer record with the provided data, generates the expire time value, and sets the timer as active. In step 344g, the timer manager 300 works with the arbiter 314 and memory controller 316 to read in the timer at the top of the active list ("TOP"). In step 344h, the timer manager 300 works with the arbiter 314 and memory controller 316 to read in the timer at the end of the active list ("END"). In step 344i, the timer manager 300 sets the UP pointer in TOP to point to the NEW record, and sets the DOWN pointer in END to point to the NEW record. In step 344*j*, the timer manager 300 sets the UP pointer in NEW to point to END, and sets the DOWN pointer in NEW to point to TOP. In step 344*k*, the timer manager 300 works with the arbiter 314 and the memory controller 316 to write the NEW, END and TOP data back to the memory 50. In step 344*l*, the timer manager 300 sends a start acknowledgement response to the NP 38. The process is then complete for that command. Step 344*m* results from step 344*c* when the address is greater, or from step 344*e* when the timer is not active. In step 344*m*, the timer manager 300 sets the timer error flag. In step 344*n*, the timer manager 300 sends the start error response to the NP 38. The process is then complete for that command.

Figure 32:
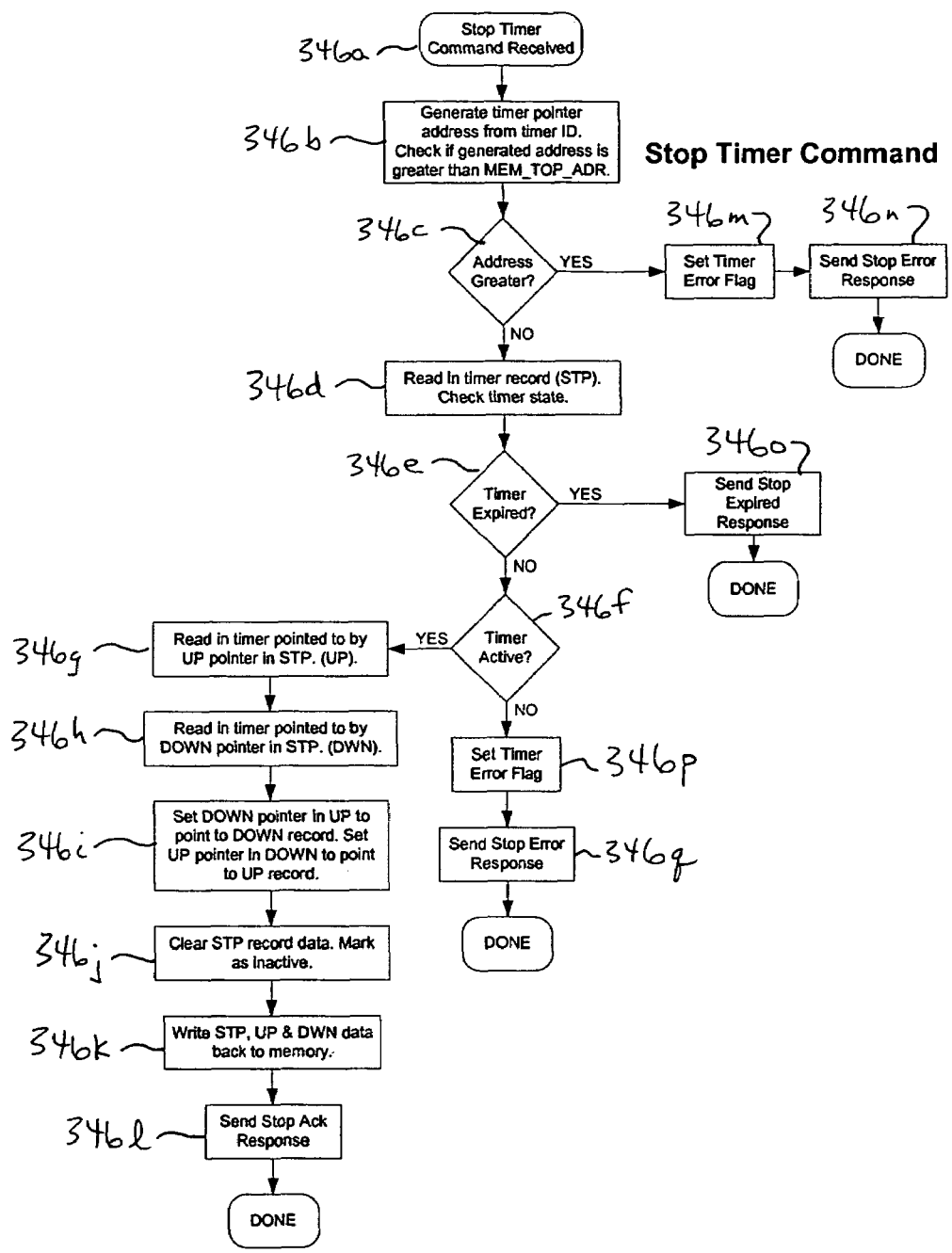
FIG. 32 is a flow diagram of the stop timer command executed by the timer manager of FIG. 23.

FIG. 32 is a flow diagram for the "Stop Timer" command. As described earlier, this command stops a currently running timer and marks it as Idle. The timer is removed from the active list. An error response is sent if the identified timer is not currently in the "Active" state or if the indicated timer is out of range. The main controller 306 generally performs the "Stop Timer" command. The remover 308 may be used to delete an active timer.

In step 346*a*, the timer manager 300 receives the stop timer command from the NP 38. In step 346*b*, the timer manager 300 generates the timer pointer address from the timer ID, and checks if the generated address is greater than MEM_TOP_ADR. In step 346*c*, the timer manager 300 determines whether the address is greater. If not, in step 346*d*, the timer manager 300 works with the arbiter 314 and the memory controller 316 to read in the timer record ("STP" record). The timer manager 300 also checks the timer state. In step 346*e*, the timer manager 300 determines if the timer has expired. If not, in step 346*f*, the timer manager 300 determines if the timer is active. If so, in step 346*g*, the timer manager 300 works with the arbiter 314 and the memory controller 316 to read in the timer pointed to by the UP pointer in STP ("UP" record). In step 346*h*, the timer manager 300 works with the arbiter 314 and the memory controller 316 to read in the timer pointed to by the DOWN pointer in STP ("DWN" record). In step 346*i*, the timer manager 300 sets the DOWN pointer in the UP record to point to the DOWN record, and sets the UP pointer in the DOWN record to point to the UP record. In step 346*j*, the timer manager clears the STP record data and marks it as inactive. In step 346*k*, the timer manager 300 works with the arbiter 314 and the memory controller 316 to write the STP, UP and DWN records back to the memory 50. In step 346*l*, the timer manager 300 sends the stop acknowledgement response to the NP 38. The process is then complete for that command.

Step 346*m* results from step 346*c* when the address is greater. In step 346*m*, the timer manager 300 sets the timer error flag. In step 346*n*, the timer manager 300 sends the stop error response to the NP 38. The process is then complete for that command.

Step 346*o* results from step 346*e* when the timer is expired. In step 346*o*, the timer manager 300 sends the stop expired response to the NP 38. The process is then complete for that command.

Step 346*p* results from step 346*f* when the timer is not active. In step 346*p*, the timer manager 300 sets the timer error flag. In step 346*q*, the timer manager 300 sends the stop error response to the NP 38. The process is then complete for that command.

Figure 33:
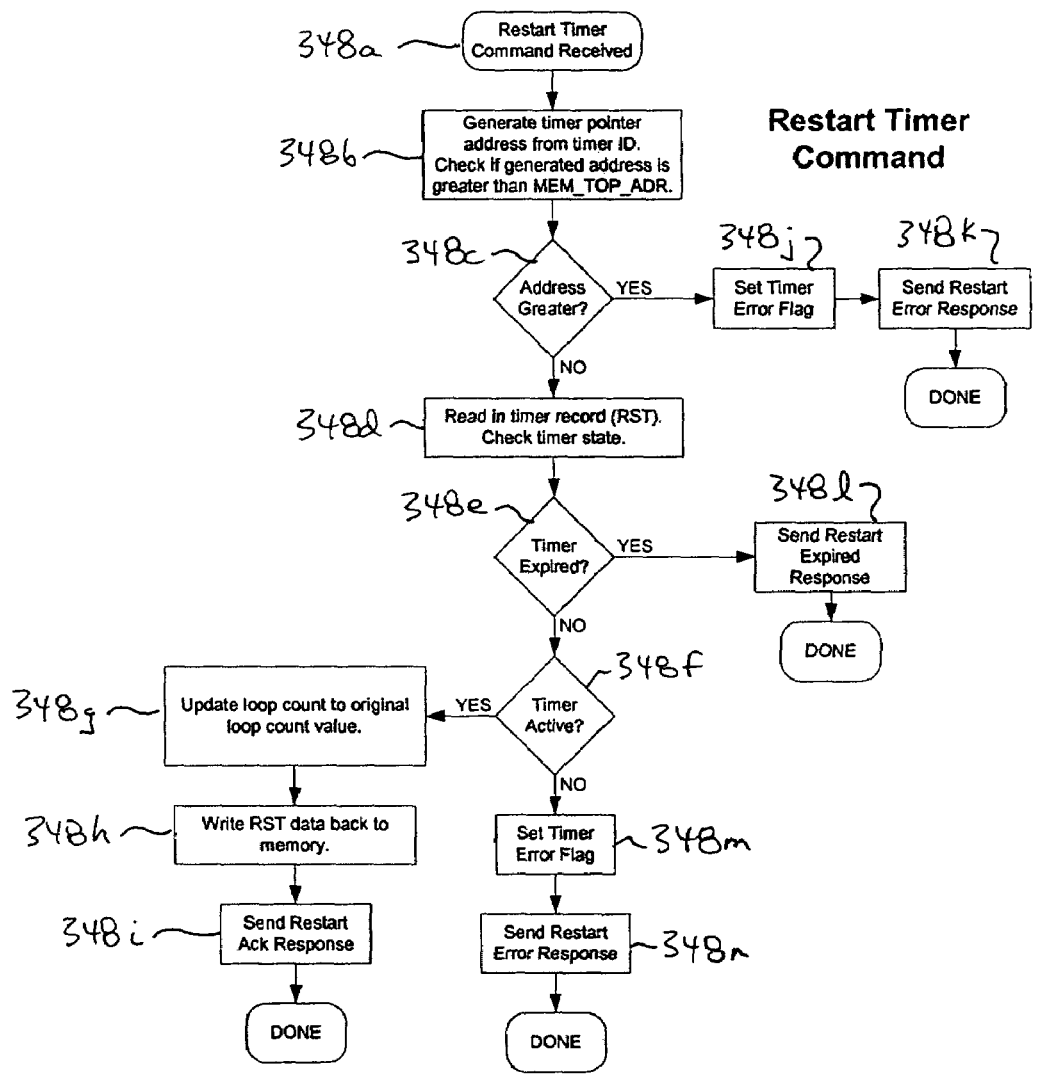
FIG. 33 is a flow diagram of the restart timer command executed by the timer manager of FIG. 23.

FIG. 33 is a flow diagram of the "Restart Timer" command. As described earlier, this command takes a currently running timer and resets its loop count value. Because the loop count value is updated and the timer is left in its current location in the active timer list, there may be some slop in the total timer time. For example, if the timer being restarted is near the top of the active list, the first loop count decrement will occur right away. This will result in the timer expiring one interval earlier than expected. An error response is sent if the identified timer is not currently in the "Active" state or if the indicated timer is out of range. The main controller 306 generally performs the "Restart Timer" command.

In step 348*a*, the timer manager 300 receives the restart timer command from the NP 38. In step 348*b*, the timer manager 300 generates the timer pointer address from the timer ID, and checks if the generated address is greater than MEM_TOP_ADR. In step 348*c*, the timer manager 300 determines whether the address is greater. If not, in step 348*d*, the timer manager 300 works with the arbiter 314 and the memory controller 316 to read in the timer record ("RST" record). The timer manager 300 also checks the timer state. In step 348*e*, the timer manager 300 determines if the timer has expired. If not, in step 348*f*, the timer manager 300 determines if the timer is active. If so, in step 346*g*, the timer manager 300 updates the loop count to the original loop count value. In step 346*h*, the timer manager 300 works with the arbiter 314 and the memory controller 316 to write the RST data back to the memory 50. In step 348*i*, the timer manager 300 sends the restart acknowledgement response to the NP 38. The process is then complete for that command.

Step 348*j* results from step 348*c* when the address is greater. In step 348*j*, the timer manager 300 sets the timer error flag. In step 348*k*, the timer manager 300 sends the restart error response to the NP 38. The process is then complete for that command.

Step 348*l* results from step 348*e* when the timer is expired. In step 348*l*, the timer manager 300 sends the restart expired response to the NP 38. The process is then complete for that command.

Step 348*m* results from step 348*f* when the timer is not active. In step 348*m*, the timer manager 300 sets the timer error flag. In step 348*n*, the timer manager 300 sends the restart error response to the NP 38. The process is then complete for that command.

Figure 34:
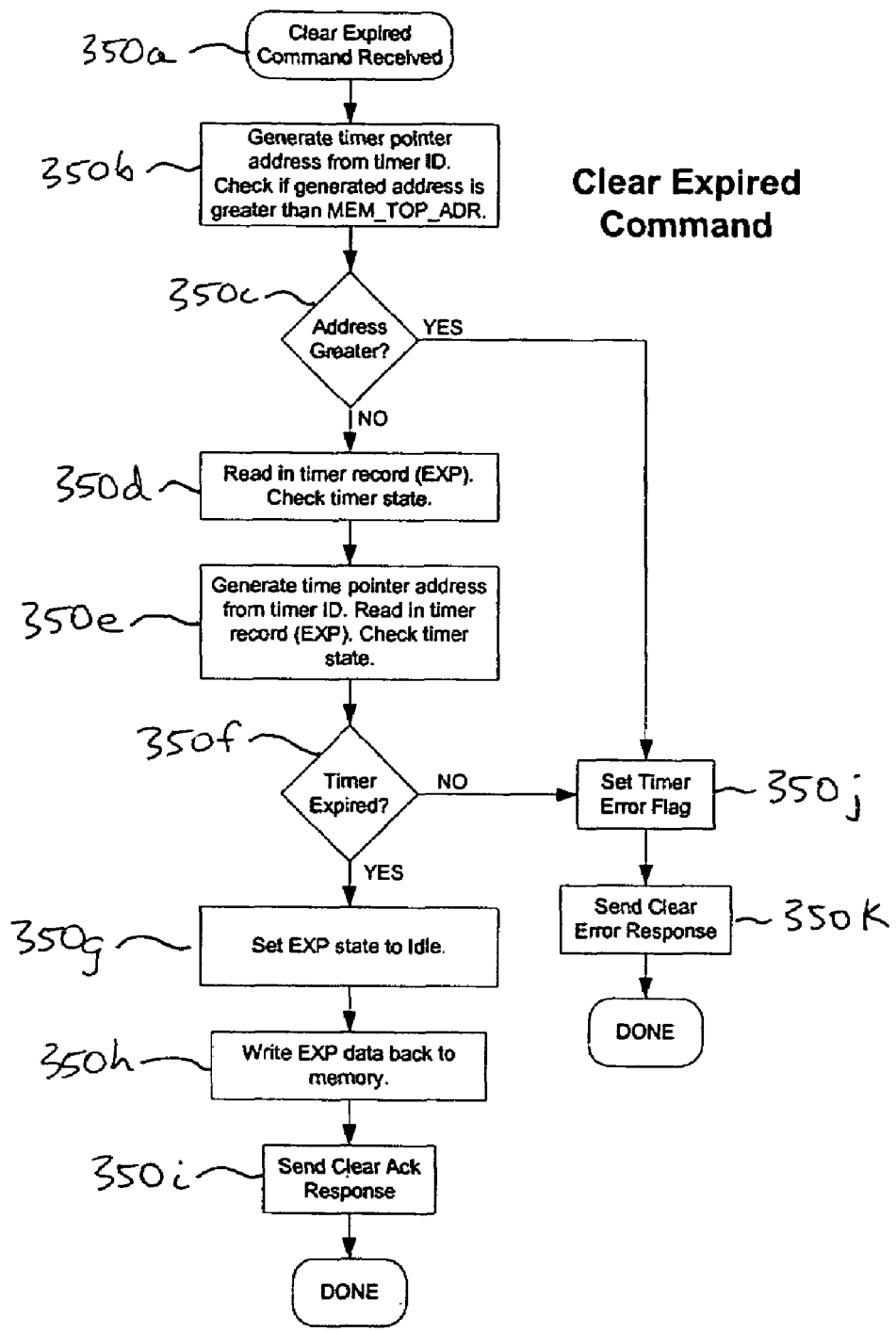
FIG. 34 is a flow diagram of the clear expired command executed by the timer manager of FIG. 23.

FIG. 34 is a flow diagram for the "Clear Expired" command. As described earlier, this command changes the state of an "Expired" timer to "Idle". This command is issued by the NP 38 after it has performed the appropriate actions following a timer expire event. An error response is sent if the identified timer is not currently in the "Active" state or if the indicated timer is out of range. The main controller 306 generally performs the "Clear Expired" command.

In step 350*a*, the timer manager 300 receives the clear expired command from the NP 38. In step 350*b*, the timer manager 300 generates the timer pointer address from the timer ID, and checks if the generated address is greater than MEM_TOP_ADR. In step 350*c*, the timer manager 300 determines whether the address is greater. If not, in step 350*d*, the timer manager 300 works with the arbiter 314 and the memory controller 316 to read in the timer record ("EXP" record). The timer manager 300 also checks the timer state. In step 350*e*, the timer manager 300 generates the timer pointer address from the timer ID. The timer manager 300 works with the arbiter 314 and the memory controller 316 to read in the timer record ("EXP" record). The timer manager 300 checks the timer state. In step 350*f*, the timer manager 300 determines if the timer is expired. If so, in step 350*g*, the timer manager 300 sets the EXP state to Idle. In step 350*h*, the timer manager 300 works with the arbiter 314 and the memory controller 316 to write the EXP data back to the memory 50.

In step 350*i*, the timer manager 300 sends the clear acknowledge response to the NP 38. The process is then complete for that command.

Step 350*j* results from step 350*c* when the address is greater or from step 350*f* when the timer is not expired. In step 350*j*, the timer manager 300 sets the timer error flag. In step 350*k*, the timer manager sends the clear error response to the NP 38. The process is then complete for that command.

Figure 35:
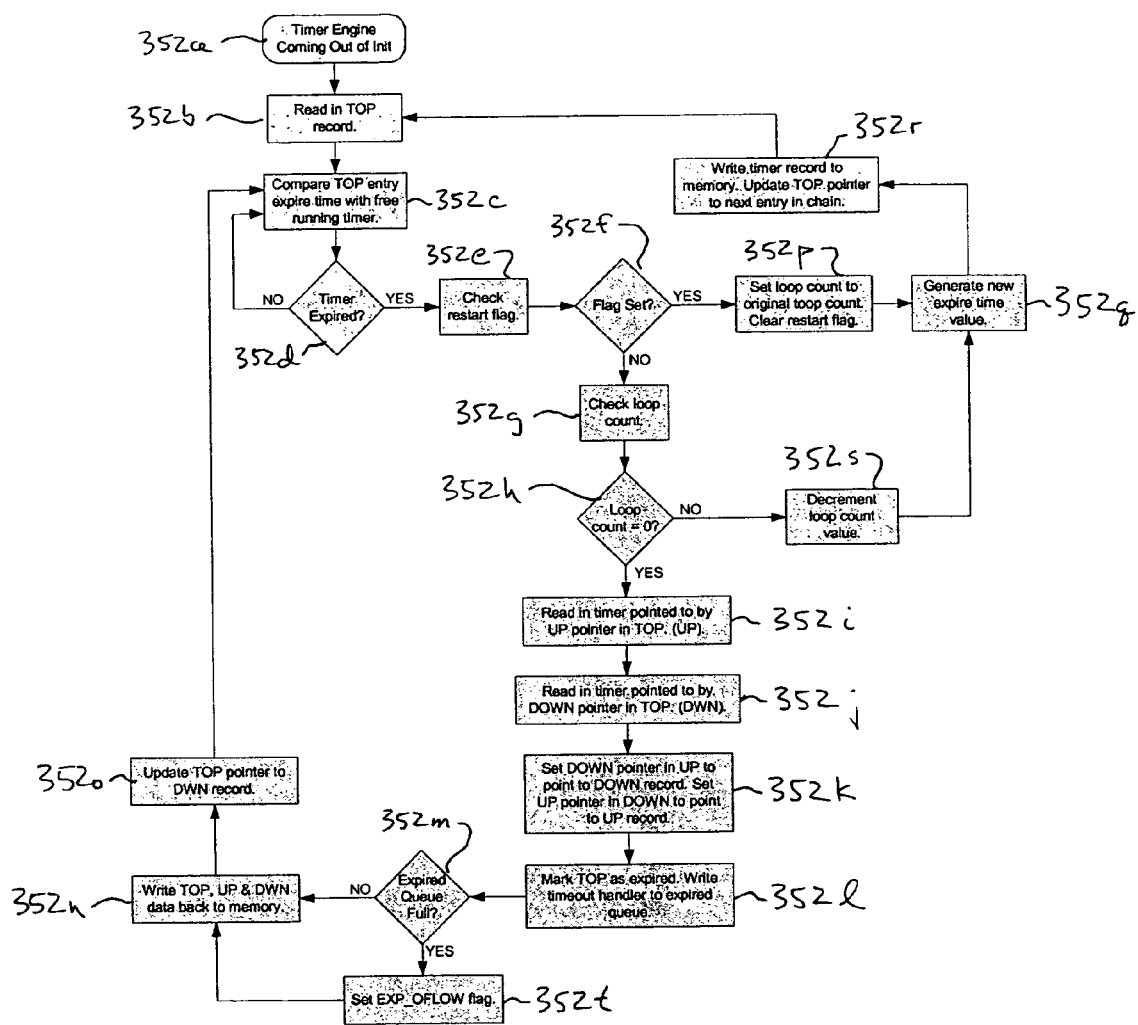
FIG. 35 is a flow diagram of a timer interval manager process executed by the timer manager of FIG. 23.

FIG. 35 is a flow diagram generally showing the operation of the timer interval managers 310 and 312. In addition to the command processing, the Timer Manager also has a Timer Engine that performs periodic updates the entries in the active timer list. This timer engine compares the expire time value of the entry at the top of the list with the free running time counter. When the expire time value is greater than or equal to the free running counter, the Timer Engine then processes the timer entry at the top of the list. The next entry in the list is then marked at the top entry and the comparison continues. These timer engine functions may generally be performed by the timer interval managers 310 and 312, which may each also be referred to as the timer engine.

In order to maximize the performance of the Timer Engine, the entry at the top of the list may be shadowed in internal memory. As soon as the Timer Engine processes the timer, a new entry may be read into the shadow memory. If the timer at the top of the list is acted on by a "Stop Timer" command, the next entry in the chain may be read in.

While the Timer Engine is active, any commands may be stalled until the updates are completed. Commands may then be processed while the Timer Engine is waiting for the top entry in the active list to expire.

An error indication that may occur during the Timer Engine operation is if an entry is to be added to the expired queue and the queue is currently full. In this case, the EXP_OFLOW flag may be sent that can cause an interrupt to be raised to the host processor or network processor 38. According to one embodiment, the expired FIFO can hold 1024 entries.

In step 352*a*, the timer engine comes out of initialization. In step 352*b*, the timer engine works with the arbiter 314 and the memory controller 316 to read in the TOP record. In step 352*c*, the timer engine compares the TOP entry expire time with the free running timer. In step 352*d*, the timer engine determines if the timer is expired. If not, the timer engine returns to step 352*c*. If so, in step 352*e*, the timer engine checks the restart flag. In step 352*f*, the timer engine determines if the flag is set. If not, in step 352*g*, the timer engine checks the loop count. In step 352*h*, the timer engine determines whether the loop count is zero. If so, in step 352*i*, the timer engine works with the arbiter 314 and the memory controller to read in the timer pointed to by the UP pointer in TOP ("UP"). In step 352*j*, the timer engine works with the arbiter 314 and the memory controller to read in the timer pointed to by the DOWN pointer in TOP ("DWN"). In step 352*k*, the timer engine sets the DOWN pointer in UP to point to the DWN record, and sets the UP pointer in DWN to point to the UP record. In step 352*l*, the timer engine marks TOP as expired, and works with the expire queue manager 318 to write the timeout handler to the expire queue 320. In step 352*m*, the timer engine determines whether the expired queue 320 is full. If not, in step 352*n*, the timer engine works with the arbiter 314 and the memory controller 316 to write the TOP, UP and DWN data back to the memory 50. In step 352*o*, the timer engine updates the TOP pointer to the DWN record and moves back to step 352*c* to continue the process.

Step 352*p* results from step 352*f* when the flag is set. In step 352*p*, the timer engine sets the loop count to the original loop count and clears the restart flag. In step 352*q*, the timer engine generates the new expire time value. In step 352*r*, the timer engine works with the arbiter 314 and the memory controller 316 to write the timer record to memory. The timer engine also updates the TOP pointer to the next entry in the chain. The process then moves back to step 352*b* to continue the process.

Step 352*s* results from step 352*h* when the loop count is not zero. In step 352*s*, the timer engine decrements the loop counter value. The process then moves back to step 352*q* to continue the process.

Step 352*t* results from step 352*m* when the expired queue is full. In step 352*t*, the timer engine sets the EXP_OFLOW flag. The process then moves back to step 352*n* to continue the process.

Timer Manager Initialization

Software starts the initialization process by setting the INIT_RST bit in the control register. This bit holds the internal state machines in a reset state while the ISA configuration registers are set.

When the Timer Manager 300 is held in the "Init" state, software will program two variables via ISA, MEM_BASE_ADR and MEM_TOP_ADR, which set the range of memory space on the external memory allocated for the Timer Manager 300. These two parameters determine the number of timers that the module should support. These addresses are the absolute addresses of external memory 1. The base address is the first queue entry location and may always be an even address. The top address is the location of the last queue entry and may always be an odd address. Each timer takes four memory words, so the difference between the two addresses divided by four gives the number of timers supported. In other embodiments, these parameters may differ.

Once the configuration values have been set, software will clear the INIT_RST bit and allow the Timer Manager initialization to complete. When initialization has completed, the TIMM_INIT flag in the Timer Manager status register will clear.

Timer Manager Status

The Timer Manager has a number of status bits that indicate the state of the internal logic.

TIMM_INIT—This flag may be set when the Timer Manager is in INIT mode and should not be accessed over the Z0 interface 42.

CMD_LOST—This flag may be set when a command has been written over the Z0 interface 42 and did not make it into the command buffer 304. The assertion of this bit can generate an interrupt to the host processor and/or the network processor 38.

TIMER_ERR—This flag may be set when a command has been issued and failed due to an unexpected state in the timer record. If a "Start Timer" command is issued and the timer is not "Idle", if a "Stop Timer" command is issued and the timer is not "Active" or "Expired", or if a "Clear Expired" command is issued and the state is not "Expired", this bit may be set. The assertion of this bit may generate an interrupt to the host processor and/or the network processor 38.

EXP_OFLOW—This flag may be set when a failed attempt to add an entry to the expired queue has occurred. This may happen if the expire queue is full and another timer expires. The assertion of this bit may generate an interrupt to the host processor and/or the network processor 38.

Although the above description has focused on specific embodiments of the present invention, various modifications and their equivalents are considered to be within the scope of the present invention, which is defined by the following claims.

What is claimed is:

1. A processor for offloading processing in a storage environment, comprising:
   a zero bus turnaround ("ZBT") interface that interfaces said processor to a network processor configured to perform a storage function;
   a hash bucket memory having an array of bit-bucket pointers that each operate as a head pointer to a linked list of active semaphore structures, the hash bucket memory addressable by a hash address derived through application of a hash function to a semaphore value and wherein each semaphore structure accommodates a current thread that owns a semaphore and potentially one or more waiting threads in a queue waiting for release of the semaphore;
   semaphore circuitry, coupled to said ZBT interface, that receives a signal from said network processor, and that controls said semaphore associated with the corresponding predetermined linked list of active semaphore structures in the hash bucket memory wherein the received signal and said semaphore are related to locking and unlocking access to data in the storage environment; and
   an update engine, further included in the semaphore circuitry, that upon receipt of a received signal from said network processor relating to a thread on said network processor, processes said semaphore related to said received signal and responds, as required, by sending a transmitted signal back to said network processor in association with said semaphore.

2. The processor of claim 1, wherein said update engine in the semaphore circuitry manages access to said semaphore by performing at least one command selected from a set of semaphore commands including: a semaphore request, a semaphore release and a thread exit.

3. The processor of claim 1, wherein said update engine in the semaphore circuitry receives a second signal from said network processor and removes a request from said queue in response to said second signal when said network processor no longer desires said semaphore.

4. The processor of claim 1, wherein said update engine in the semaphore circuitry refrains from sending to said network processor a second signal indicating said semaphore is unavailable, whereby said network processor continues to wait for said semaphore and said semaphore circuitry maintains ordered access to said queue.

5. The processor of claim 1, wherein said signal comprises one of a plurality of access requests for one of a plurality of semaphores, wherein said semaphore circuitry manages said plurality of access requests in a plurality of queues, and wherein each of said plurality of queues corresponds to a respective one of said plurality of semaphores.

6. The processor of claim 1, wherein said semaphore circuitry comprises:
   a command queue that stores said signal received from said network processor.

7. The processor of claim 1, wherein said semaphore is associated with a semaphore structure in the array of bit-bucket pointers in the hash bucket memory and wherein said semaphore circuitry comprises:
   a hash key generator that performs a hashing function on said signal for accessing said hash array.

8. The processor of claim 1, wherein said update engine in the semaphore circuitry receives a second signal from said network processor relating to a first process thread on said network processor, releases a lock on said semaphore related to said second signal, and sends a third signal to said network processor associating said semaphore with a second process thread on said network processor.

9. The processor of claim 1, wherein said update engine in the semaphore circuitry further comprises:
   a semaphore queue manager that manages a queue of a plurality of semaphores.

10. The processor of claim 1, wherein said semaphore circuitry manages a queue for access to said semaphore, wherein said semaphore circuitry comprises:
    a hash key generator that performs the hashing function on said signal for accessing the hash bucket memory having an array of bit-bucket pointers, and that generates a hash key related to said signal, wherein said semaphore is associated with a semaphore structure in said array of bit-bucket pointers, and wherein said signal relates to a first process thread on said network processor; and
    the update engine, coupled to said hash key generator, that receives said hash key, that releases a lock on said semaphore related to said hash key, and that sends a second signal to said network processor associating said semaphore with a second process thread on said network processor, wherein said first process thread and said second process thread are associated with said semaphore in said queue.

11. A method of controlling a processor for offloading processing in a storage environment, comprising the steps of:
    receiving a signal from a network processor configured to perform a storage function through a zero bus turnaround ("ZBT") interface;
    assigning a current thread as owner of a semaphore and potentially one or more waiting threads in a queue waiting for release of the semaphore to a semaphore structure in a linked list of active semaphore structures stored in a hash bucket memory addressable through application of a hash function to a semaphore value associated with the semaphore;
    controlling said semaphore associated with the linked list of active semaphore structures in the hash bucket memory wherein the received signal and the semaphore are related to locking and unlocking access to data in the storage environment; and
    processing the received signal from said network processor relating to a thread on said network processor and responding, as required, by sending a transmitted signal back to said network processor in association with said semaphore.

12. The method of claim 11, wherein said step of controlling said semaphore further includes managing access to said semaphore by performing at least one command selected from a set of commands including: a semaphore request, a semaphore release and a thread exit.

13. The method of claim 11, further comprising:
    receiving a second signal from said network processor; and
    removing a request from said queue in response to said second signal when said network processor no longer desires said semaphore.

14. The method of claim 11, further comprising:
    refraining from sending to said network processor a second signal indicating said semaphore is unavailable, whereby said network processor continues to wait for said semaphore and said processor maintains ordered access to said queue.

15. The method of claim 11, wherein said signal comprises one of a plurality of access requests for one of a plurality of semaphores, and wherein said step of controlling said semaphore includes:
- managing said plurality of access requests in a plurality of queues, wherein each of said plurality of queues corresponds to a respective one of said plurality of semaphores.

16. The method of claim 11, wherein said step of controlling said semaphore includes:
- receiving a second signal from said network processor relating to a first process thread on said network processor;
- releasing a lock in said semaphore related to said second signal; and
- sending a third signal to said network processor associating said semaphore with a second process thread on said network processor.

17. The method of claim 11, wherein said signal comprises one of a plurality of access requests for one of a plurality of semaphores, and wherein said step of controlling said semaphore includes:
- managing said plurality of access requests in a plurality of queues, wherein each of said plurality of queues corresponds to a respective one of said plurality of semaphores;
- receiving a second signal from said network processor relating to a first process thread on said network processor;
- releasing a lock on said semaphore related to said second signal; and
- sending a third signal to said network processor associating said semaphore with a second process thread for said network processor.

* * * * *